(12) United States Patent
Usami et al.

(10) Patent No.: US 8,299,639 B2
(45) Date of Patent: Oct. 30, 2012

(54) STARTER FOR STARTING INTERNAL COMBUSTION ENGINE

(75) Inventors: Shinji Usami, Okazaki (JP); Yasuyuki Yoshida, Chita-gun (JP); Mitsuhiro Murata, Niwa-gun (JP); Masami Niimi, Handa (JP); Hideya Notani, Kariya (JP); Kazushige Okumoto, Kariya (JP); Akira Kato, Kani (JP); Mikio Saito, Mizuho (JP)

(73) Assignee: Denso Corporation, Kariya (JP)

( * ) Notice: Subject to any disclaimer, the term of this patent is extended or adjusted under 35 U.S.C. 154(b) by 429 days.

(21) Appl. No.: 12/760,278

(22) Filed: Apr. 14, 2010

(65) Prior Publication Data
US 2010/0264670 A1    Oct. 21, 2010

(30) Foreign Application Priority Data

| Apr. 17, 2009 | (JP) | 2009-101090 |
|---|---|---|
| May 20, 2009 | (JP) | 2009-121758 |
| Aug. 26, 2009 | (JP) | 2009-195735 |
| Sep. 15, 2009 | (JP) | 2009-212966 |
| Dec. 14, 2009 | (JP) | 2009-282783 |

(51) Int. Cl.
*F02N 11/00* (2006.01)
(52) U.S. Cl. ............ 290/38 R; 123/179.1
(58) Field of Classification Search ........ 290/38 R; 123/179.25
See application file for complete search history.

(56) References Cited

U.S. PATENT DOCUMENTS

| 4,901,689 | A | * | 2/1990 | Cummins et al. | 123/179.3 |
|---|---|---|---|---|---|
| 5,132,604 | A | * | 7/1992 | Shimane et al. | 322/10 |
| 5,622,148 | A | * | 4/1997 | Xue et al. | 123/179.25 |
| 7,275,509 | B2 | | 10/2007 | Kassner | |
| 7,665,438 | B2 | * | 2/2010 | Hirning et al. | 123/179.3 |
| 7,948,099 | B2 | * | 5/2011 | Mottier | 290/38 R |
| 8,169,281 | B2 | * | 5/2012 | Andoh | 335/126 |
| 2005/0082835 | A1 | * | 4/2005 | Shimoyama et al. | 290/38 R |
| 2008/0127927 | A1 | | 6/2008 | Hirning et al. | |
| 2008/0162007 | A1 | * | 7/2008 | Ishii et al. | 701/54 |
| 2009/0183595 | A1 | | 7/2009 | Niimi | |
| 2010/0083926 | A1 | * | 4/2010 | Okumoto et al. | 123/179.4 |
| 2010/0251984 | A1 | * | 10/2010 | Bouchon et al. | 123/179.3 |
| 2011/0118962 | A1 | * | 5/2011 | Couetoux et al. | 701/113 |

FOREIGN PATENT DOCUMENTS

| DE | 10 2005 049 942 A1 | 4/2007 |
|---|---|---|
| JP | Y2 56-42437 | 10/1981 |
| JP | A-58-217763 | 12/1983 |
| JP | A 10-184505 | 7/1998 |
| JP | A 2007-107527 | 4/2007 |
| JP | A 2008-510099 | 4/2008 |
| JP | A 2009-191843 | 8/2009 |
| WO | WO 2007/101770 A1 | 9/2007 |

OTHER PUBLICATIONS

Sep. 29, 2011 Office Action issued in Chinese Patent Application No. 201010196101.2 (with translation).

* cited by examiner

*Primary Examiner* — Joseph Waks
(74) *Attorney, Agent, or Firm* — Oliff & Berridge, PLC

(57) ABSTRACT

In a starter for starting an internal combustion engine with a first output shaft to which a ring gear is coupled, a motor has a second output shaft to which a movable pinion member is coupled and is operative to, when energized, rotate the second output shaft. A solenoid device includes a solenoid actuator linked to the movable pinion member. The solenoid actuator is configured to, when activated, shift the movable pinion member toward the ring gear to be engaged with the ring gear. The solenoid device includes a solenoid switch configure to, when activated, energize the motor. The solenoid actuator and the solenoid switch are integrated with each other to provide the solenoid device. A controller module is configured to individually control an activation of the solenoid actuator and an activation of the solenoid switch. The controller module is mounted on the solenoid device.

15 Claims, 25 Drawing Sheets

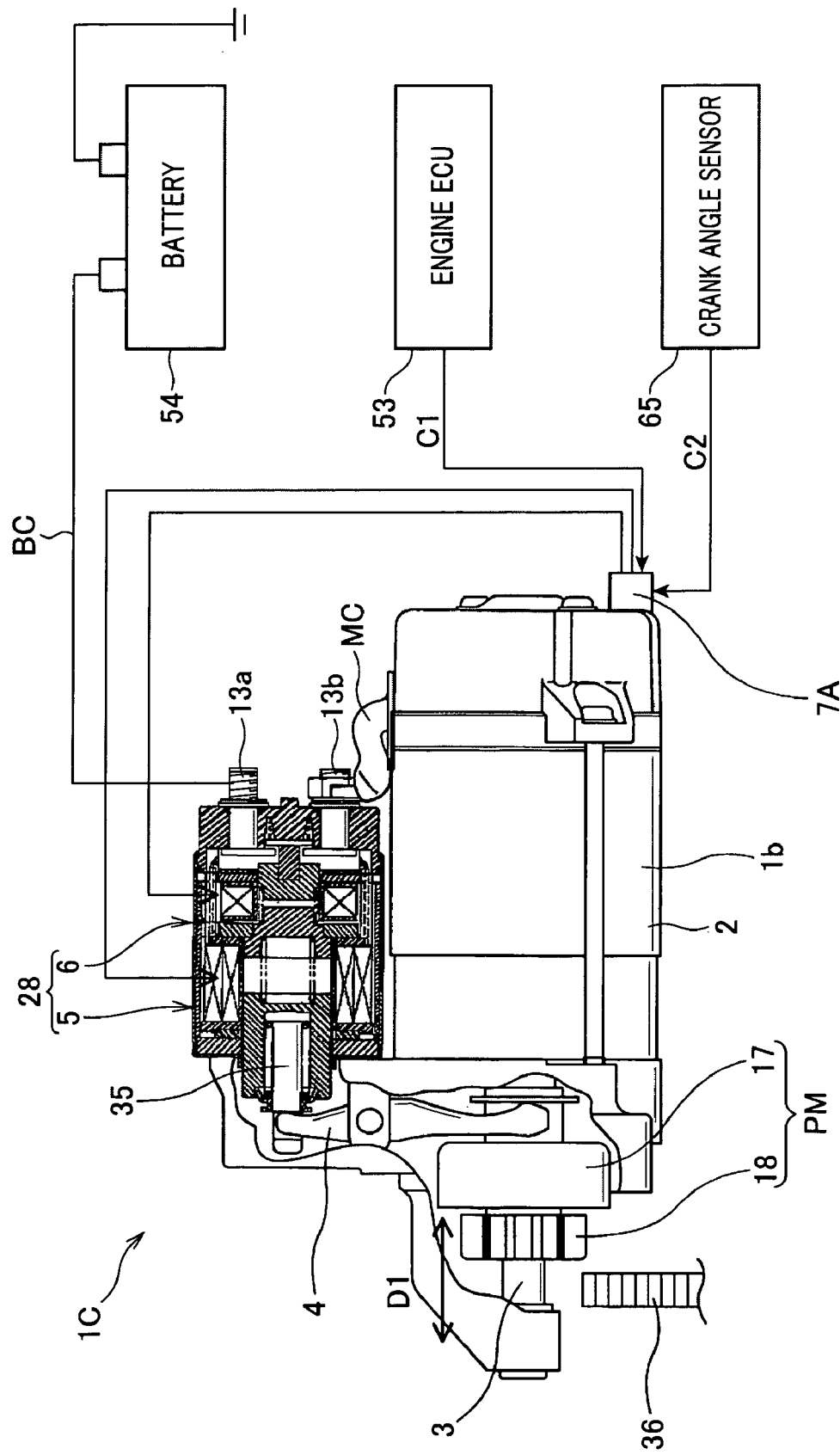

STARTER FOR STARTING INTERNAL COMBUSTION ENGINE

CROSS REFERENCE TO RELATED APPLICATIONS

This application is based on Japanese Patent Applications 2009-101090, 2009-121758, 2009-195735, 2009-212966, and 2009-282783 filed on Apr. 17, 2009, May 20, 2009, Aug. 26, 2009, Sep. 15, 2009, and Dec. 14, 2009. This application claims the benefit of priority from the Japanese Patent Applications, so that the descriptions of which are all incorporated herein by reference.

FIELD OF THE INVENTION

The present invention relates to starters including: an electromagnetic actuator for shifting a pinion to an internal combustion engine, and an electromagnetic switch for energizing and deenergizing the motor. More particularly, the present invention relates to such starters designed to individually control the operation of the electromagnetic actuator and that of the electromagnetic switch.

BACKGROUND OF THE INVENTION

Some types of vehicles installed with an engine automatic stop-and-restart system, such as an idle reduction control system, have been recently increasing for reduction in fuel cost, in exhaust emission, and the like. Such an idle reduction system installed in a vehicle is designed to shut off the supply of fuel to an internal combustion engine when, for example, the vehicle is temporarily stopped at a light or by a traffic jam, thus automatically stopping the internal combustion engine, referred to simply as "engine".

After the stop of the engine, the idle reduction system is designed to automatically activate a starter in response to a driver's operation to restart the vehicle so that the starter cranks the engine, thus restarting it.

There are requirements to restart the engine during the vehicle coasting (being rotated without the aid of the engine) after the stop of the engine by the idle reduction system. In order to meet these requirements, starters are required for restart of the engine during the vehicle coasting in response to the driver's determination.

Conventional starters are normally designed to shift a pinion mounted on an output shaft of a motor to a ring gear of the engine concurrently with the movement of a movable contact of a switch to a stationary contact thereof for the electrical connection between the motor and a power supply unit in order to crank the engine.

Thus, in a vehicle integrated with such a conventional starter, if the conventional starter shifts the pinion to the ring gear of the engine concurrently with the movement of the movable contact of the switch to the stationary contact thereof during the vehicle coasting, it may be difficult for the pinion to be meshed with the ring gear due to the lack of the number of rotations of the motor, resulting in that the pinion may turn over without being engaged with the ring gear.

For this reason, these conventional starters are designed to shift the pinion to the ring gear of the engine so as to crank the engine after the rotation of the engine has been completely stopped.

Thus, in a vehicle integrated with such a conventional starter, after the vehicle has been temporally stopped at a red light so that the engine has been stopped, even if the red light is changed to green, the conventional starter cannot restart the engine immediately after the change of the red light to green so that the vehicle cannot be started immediately thereafter.

Accordingly, there are requirements to restart the engine in response to the driver's determination according to traffic conditions around the vehicle even if the vehicle is decelerated.

WO Patent Publication NO. 2007-101770-A1 discloses an example of techniques associated with a function capable of engaging the pinion with the ring gear of the engine during the vehicle being decelerated so as to restart the engine.

A starter disclosed in the WO Patent Publication is equipped with an electromagnetic actuator operative to shift a pinion mounted on an output shaft of a motor to a ring gear of an engine, and a switch operative to establish the electrical connection between the motor and a power supply unit and shut off the electrical connection therebetween. The starter is also equipped with a controller adapted to individually control the activation of the electromagnetic actuator and the actuation of the switch.

When an engine restart request occurs during the vehicle being decelerated after the stop of the engine, the starter designed set forth above controls the electromagnetic actuator to shift the pinion of the motor to the ring gear to be engaged therewith, and turns on the switch to rotate the motor, thus cranking the engine.

SUMMARY OF THE INVENTION

The inventors have discovered that there are some problems in the starter disclosed in the WO Patent Publication.

Normal starters for cranking the engine essentially require configurations that withstand frequent vibration because they are directly subject to the frequent vibration due to the engine rotation.

In the starter disclosed in the WO Patent Publication as being viewed from this point, the controller is mounted on a supporting flange that supports the electromagnetic actuator and the motor, and the switch is disposed to be separated from the controller. For this reason, relatively long wires (cables) are required for electrically connecting the controller and the switch. As a result, the frequent vibration due to the engine rotation may cause the wires to become broken. In addition, the starter disclosed in the WO Patent Publication is normally installed in an engine room. For this reason, in installing the starter in the engine room, the relatively long wires for electrically connecting the controller and the switch may be caught on accessories for the engine placed around the engine and/or on another component placed in the engine room. These results may cause the wires to become broken.

Moreover, in the starter disclosed in the WO Patent Publication, as illustrated in FIGS. 1 and 2 of the Publication, the electromagnetic actuator and the controller are placed on either side of the motor so that relatively long wires are also required for electrically connecting the electromagnetic actuator and the controller over the motor. As a result, for the same reasons as the electrical connection between the controller and the switch, the wires for electrically connecting the electromagnetic actuator and the controller may become broken.

In view of the circumstances set force above, the present invention seeks to provide starters designed to solve at least one of the problems set forth above.

Specifically, the present invention aims at providing starters, each of which is designed to:

prevent wiring members (conductive members) for electrically connecting a controller and both of an electromagnetic actuator for shifting a pinion and an electromagnetic switch for energizing a motor from being broken even if a corresponding starter is subjected to frequent vibration; and/or facilitate the installation of the corresponding starter in an engine room without breaking the wiring members.

According to one aspect of the present invention, there is provided a starter for starting an internal combustion engine with a first output shaft to which a ring gear is coupled. The starter includes a motor having a second output shaft to which a movable pinion member is coupled and is operative to, when energized, rotate the second output shaft. The starter includes a solenoid device including a solenoid actuator linked to the movable pinion member. The solenoid actuator is configured to, when activated, shift the movable pinion member toward the ring gear to be engaged with the ring gear. The solenoid device include a solenoid switch configure to, when activated, energize the motor. The solenoid actuator and the solenoid switch are integrated with each other to provide the solenoid device. The starter includes a controller module configured to individually control an activation of the solenoid actuator and an activation of the solenoid switch. The controller module is mounted on the solenoid device.

In the configuration of the starter according to the one aspect of the present invention, the controller module is mounted on the solenoid device. This allows the length of wiring for electrical connection between the solenoid device and the controller to be reduced in comparison to the structure of the WO Patent Publication set forth above in which: the switch is disposed to be separated from the controller, and the electromagnetic actuator and the controller are placed on either side of the motor.

Thus, the starter according to the one aspect of the present invention prevents the wiring for electrical connection between the solenoid device and the controller from being broken even if the starter is subjected to frequent vibration due to the rotation of the internal combustion engine.

In addition, even if wires are used as the wiring for electrical connection between the solenoid device and the controller module, the length of each of the wires is reduced in comparison to the structure of the WO Patent Publication set forth above in which: the switch is disposed to be separated from the controller, and the electromagnetic actuator and the controller are placed on either side of the motor.

Thus, even if the starter is installed in an engine room of a motor vehicle, the starter reduces the risk of the wires that may be caught on accessories for the internal combustion engine placed therearound and/or on another component placed in the engine room.

BRIEF DESCRIPTION OF THE DRAWINGS

Other objects and aspects of the invention will become apparent from the following description of embodiments with reference to the accompanying drawings in which:

FIG. 7 is a structural view of a starter according to the fourth embodiment of the present invention;

DETAILED DESCRIPTION OF EMBODIMENTS OF THE INVENTION

Figure 1:
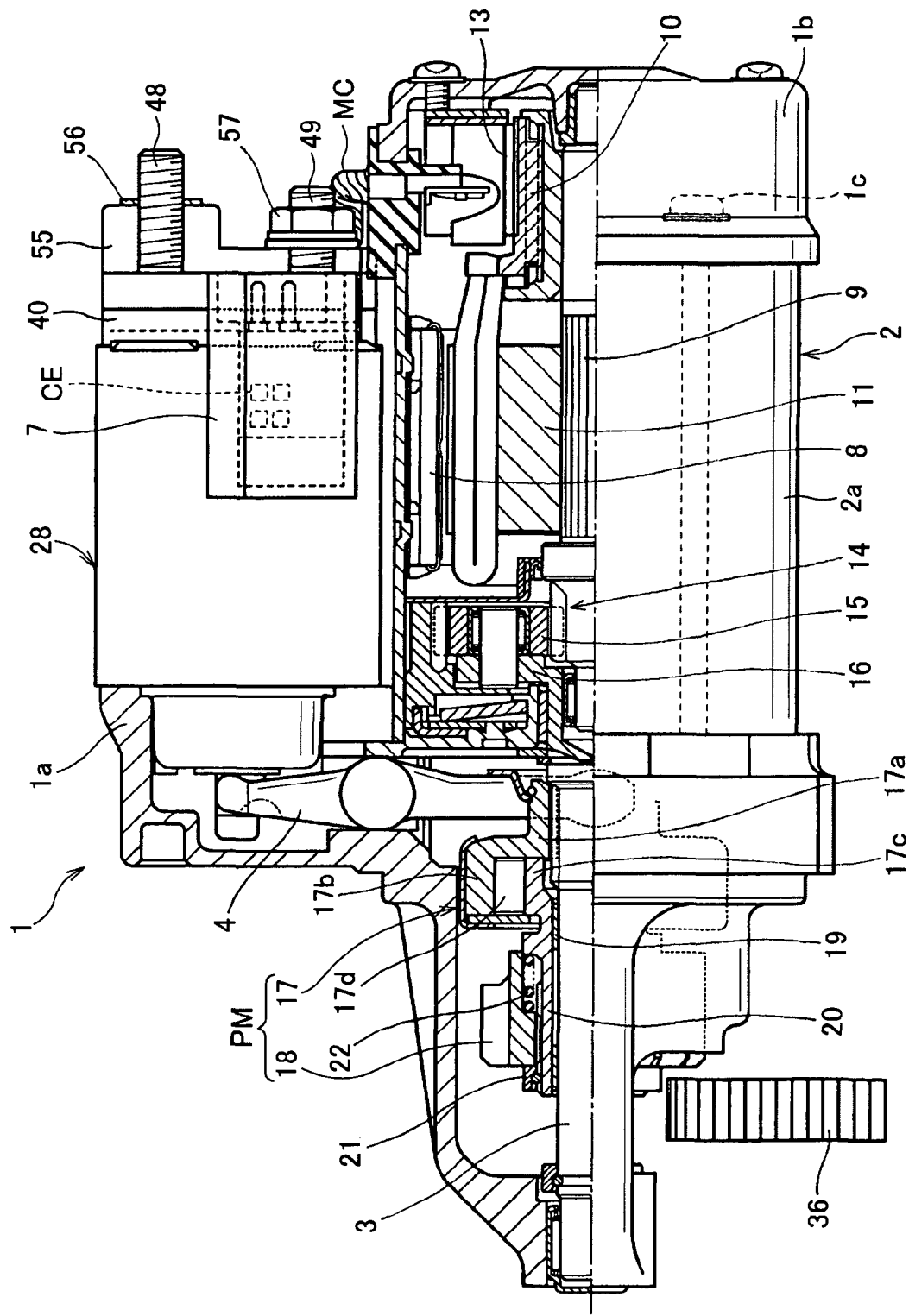
FIG. 1 is a partially axial cross sectional view of a starter according to the first embodiment of the present invention.

Embodiments of the present invention will be described hereinafter with reference to the accompanying drawings.

In the embodiments, like parts between the embodiments, to which like reference characters are assigned, are omitted or simplified in redundant description.

First Embodiment

Referring to FIGS. 1 to 4, a starter 1 according to the first embodiment of the present invention is installed in a motor vehicle. The motor vehicle is equipped with an idle reduction system for automatically controlling the stop and restart of an internal combustion engine (referred to simply as "engine") installed in the motor vehicle. The starter, idle reduction system, and the engine are placed in an engine room of the motor vehicle.

Specifically, the starter 1 includes a front housing (front frame) 1a, an end housing (end frame) 1b, a motor 2, an output shaft 3, an electromagnetic (solenoid) actuator 5 having a shift lever 4, an electromagnetic (solenoid) switch 6, and an idle-reduction ECU (Electronic Control Unit) 7 as an example of controllers according to the present invention.

The motor 2 includes an outer annular yoke 2a fastened from both axial ends by the front and end housings 1a and 1b with through bolts 1c. The front and end housings 1a and 1b and the yoke 2a of the motor 2 constitute the housing of the motor 2 (starter 1).

In addition, the motor 2 includes an annular field member 8 made up of, for example, a plurality of permanent magnets and coaxially located inside the yoke 2a so that the yoke 2a prevents magnetic force of the permanent magnets from leaking out of the yoke 2a. The motor 2 includes an output shaft 9 and an annular armature (rotor) 11 coaxially located inside the annular field member 8 with a gap therebetween; this output shaft 9 has an outer circumferential surface on which the armature 11 is mounted.

The annular armature 11 is provided at its one axial end with an annular commutator 10 consisting of a plurality of commutator segments. For example, the annular armature 11 consists of a plurality of armature coils electrically connected to the plurality of commutator segments 10, respectively.

The motor 2 includes, for example, a pair of brushes 13 urged by a pair of brush springs 12 (see FIG. 4) so that each of the brushes 13 is brought into constant abutment with at least one of the plurality of commutator segments 10.

When an electric power is applied across the brushes 13, the brushes 13 and the plurality of commutator segments 10 provide a current in at least some of the plurality of armature coils so that each of the plurality of armature coils creates a magnetic field whose magnetic polarity is alternatively changed. The generated magnetic field of the armature 11 and the magnetic field generated by the field member 8 create torque that rotates the armature 11 relative to the field member 8 to thereby rotate the output shaft 9.

The starter 1 also includes a reduction mechanism 14 coaxially mounted on one end of the output shaft 9. The reduction mechanism 14 is designed to transfer the torque of the output shaft 9 while reducing the rotational speed of the output shaft 9, thus increasing the torque that rotates the output shaft 3.

For example, as the reduction mechanism 14, a planetary-gearset mechanism is used. The planetary-gearset mechanism 14 consists of, for example, a central sun gear mounted on the one end of the output shaft 9, an annular internal gear, two or more planet gears 15 that surround the central sun gear, and a planetary carrier 16 having an internal gear with which the planet gears 15 are, in turn, meshed; this planetary carrier 16 is integrally mounted on the output shaft 3.

The planetary-gearset mechanism 14 is configured to convert the rotation of the central sun gear into the rotation of each of the planet gears 15 around the central sun gear, thus rotating the planetary carrier 16 together with the output shaft 3 while increasing the torque of the output shaft 3 as compared with that of the output shaft 9.

The starter 1 includes a movable pinion member PM consisting of a clutch 17 and a pinion 18.

As illustrated in FIG. 1, the clutch 17 is made up of a cylindrical spline barrel 17a, an annular clutch outer 17b, a cylindrical clutch inner 17c, rollers 17d, bearings 19, and roller springs (not shown).

The spline barrel 17a is mounted in helical-spline fit on the outer surface of the output shaft 3 to be axially shiftable and rotatable together with the output shaft 3. The clutch outer 17b has a diameter greater than that of the spline barrel 17a and extends from the spline barrel 17a.

The clutch inner 17c is mounted on the outer circumference of the output shaft 3 in opposite to the clutch outer 17b to be rotatable and axially shiftable via the bearings 19. The spline barrel 17a forms a plurality of cam chambers between the inner circumference thereof and the outer circumference of the clutch inner 17c, and a plurality of spring chambers communicating with the plurality of cam chambers, respectively; the plurality of rollers 17d are installed in the plurality of chambers, respectively.

Each of the cam chambers has, for example, a substantially wedged shape in its circumferential direction so that one circumferential end thereof is narrower than the other circumferential end thereof. Each of the plurality of springs is located in a corresponding one of the plurality of spring chambers such that a corresponding one of the plurality of rollers 17d is urged toward the narrower end of a corresponding one of the plurality of cam chambers.

The clutch inner 17c extends in the axial direction of the output shaft 3 away from the motor 2 to form a cylindrical inner tube 20 with an outer circumferential on which the pinion 18 is mounted in spline fit. This allows the pinion 18 to be shiftable in the axial direction of the output shaft 3 together with the clutch inner 17c. A stopper 21 is so mounted around the output shaft 3 as to limit the movement of the pinion 18 in the axial direction thereof away from the motor 2.

The clutch 17 is designed as a one-way clutch operative to transfer rotational motion supplied from the motor 2 to the pinion 18 without transferring rotational motion supplied from the pinion 18 to the motor 2.

The pinion 18 has a plurality of inner surfaces between their gears that face a plurality of outer surfaces of the inner tube 20 between their splines, respectively. A plurality of elastic members, such as springs, are installed in a plurality of spaces formed between the plurality of inner surfaces and the plurality of outer surfaces, respectively. Each of the elastic members has stored therein elastic force that urges the pinion 18 so as to be pressed into abutment with the pinion stopper 21.

The solenoid actuator 5 is operative to actuate the shift lever 4 to thereby shift the movable pinion member PM in the axial direction of the output shaft 3. The solenoid switch 6 is operative to select energization and deenergization of the motor 2.

Figure 2:
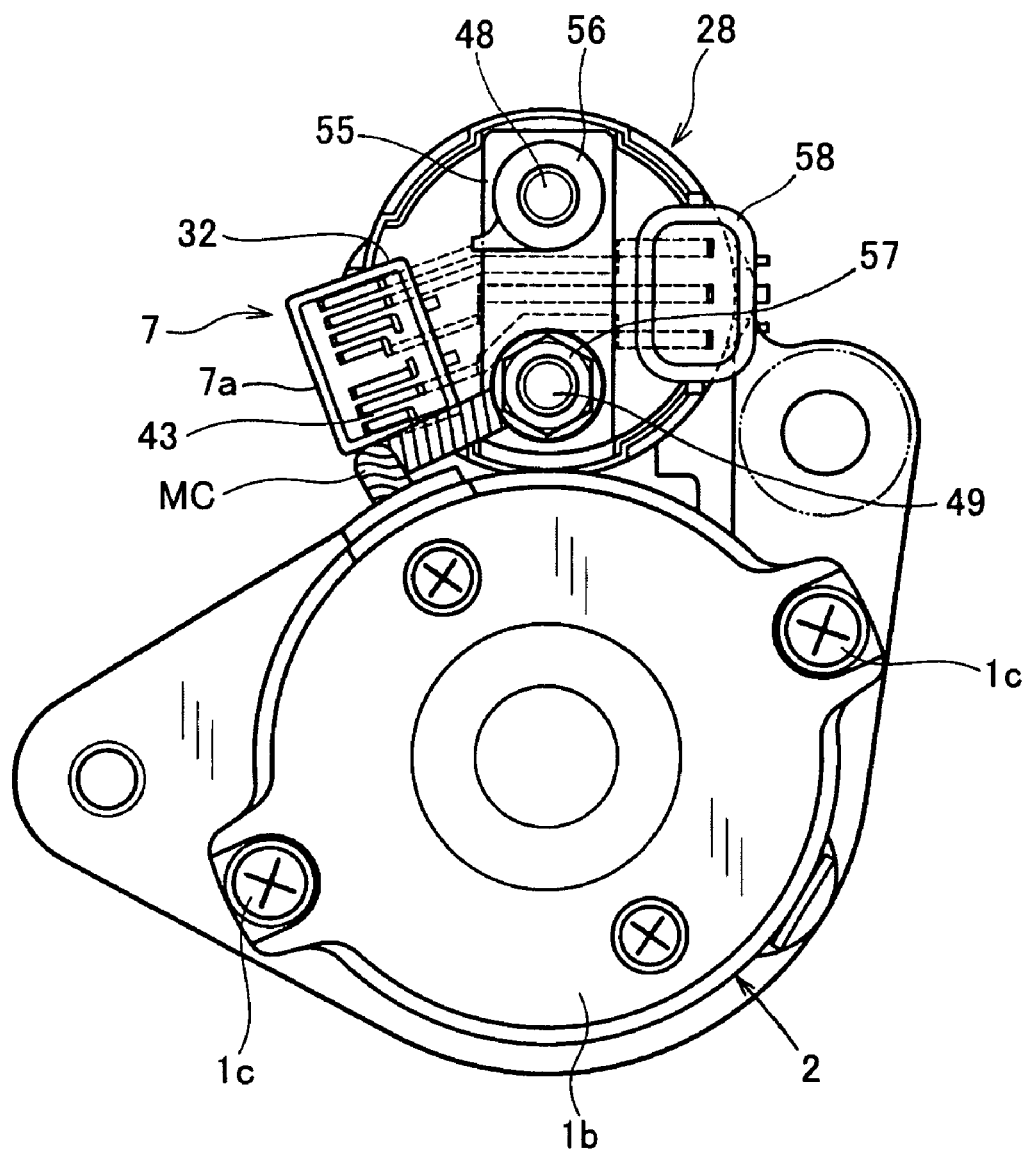
FIG. 2 is a plan view of the starter, when it is viewed from one axial end side of the starter opposite to the other axial end side of the starter close to an internal combustion engine, according to the first embodiment of the present invention.
Figure 3:
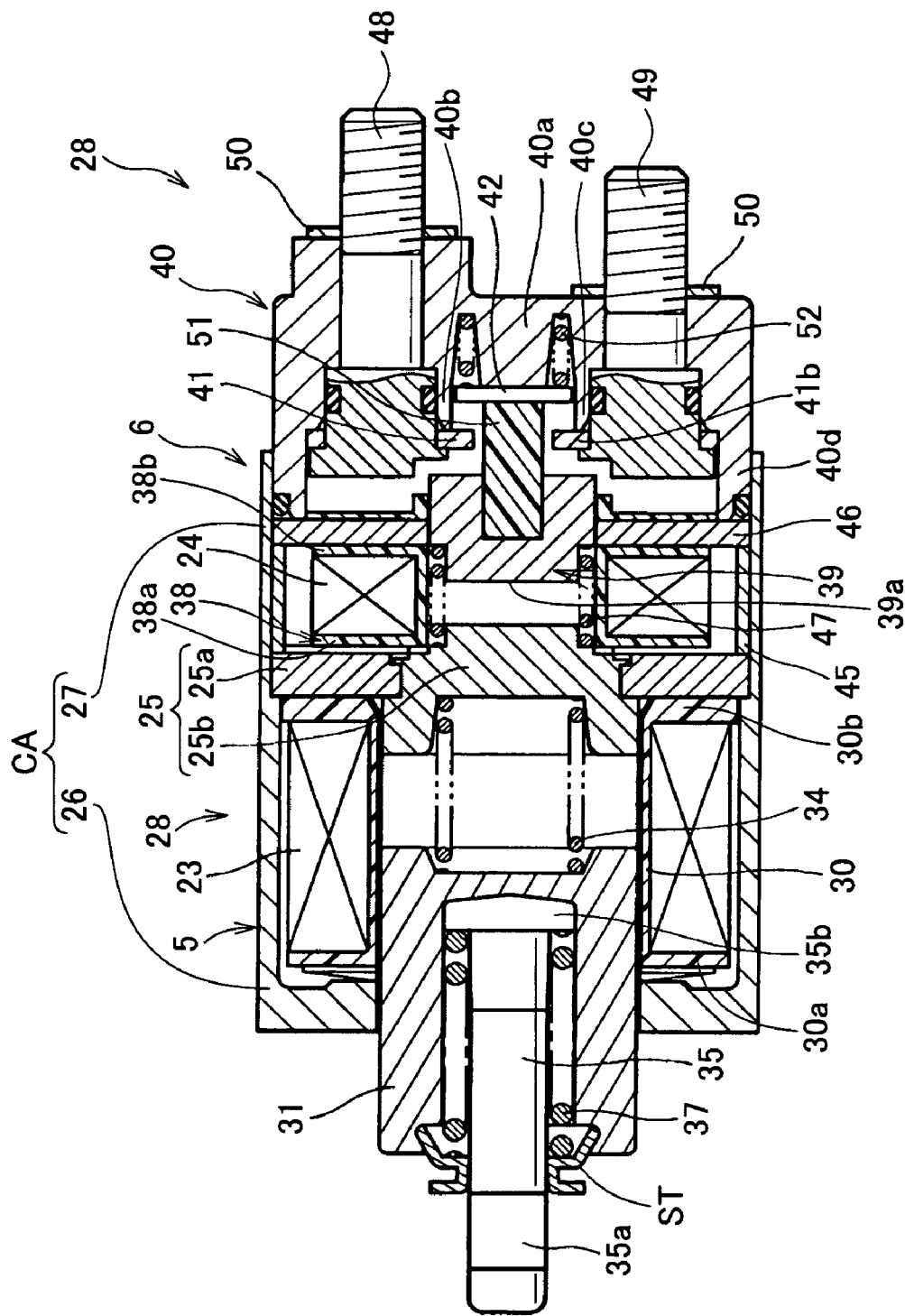
FIG. 3 is an axial cross sectional view of a solenoid device of the starter according to the first embodiment of the present invention.

Referring to FIGS. 1 to 3, the solenoid actuator 5 and the solenoid switch 6 according to the first embodiment are aligned in parallel to the axial direction of the motor 2. In addition, the solenoid actuator 5 and the solenoid switch 6 share a fixed core 25 and a hollow cylindrical case CA that is comprised of a first hollow cylindrical case (first case) 26 that serves as a case and a yoke of the solenoid actuator 5, and of a second hollow cylindrical case (second case) 27 that serves as a case and a yoke of the solenoid switch 6; these first and second cases 26 and 27 are continuously formed in parallel to the axial direction of the motor 2.

Specifically, the solenoid actuator 5 and the solenoid switch 6 are so aligned in parallel to the axial direction of the motor 2 as to be integrally formed as a solenoid device 28 for the starter 1 according to the first embodiment.

The case CA (first case 26) has one annular end (bottom) close to the front housing 1a of the starter 1, and the case CA (second case 27) has one opening end opposite to the bottom.

Referring to FIG. 1, one part of the outer circumferential end of the front housing 1a outwardly extends in a radial direction of the motor 2. The bottom of the case CA is fastened at its outer peripheral portion to the front housing 1a by a pair of stud bolts (not shown). The case CA has a constant outer diameter in its axial direction, and the first case 26 has an inner diameter smaller than an inner diameter of the second case 27 so that the first case 26 is greater in wall thickness than the second case 27. That is, the case CA has an inner shoulder (stepped shoulder) at the boundary between the first case 26 and the second case 27.

The fixed core 25 is comprised of an annular core plate 25a and a circular core body 25b fitted in the inner circumference of the core plate 25a. An edge of one outer surface of the core plate 25a facing the first case 26 is seated on the inner shoulder of the case CA so that the core plate 25a is positioned in the axial direction of the case CA.

First, the structure of the solenoid actuator 5 according to the first embodiment will be described hereinafter.

Referring to FIG. 3, the solenoid actuator 5 includes the first case (yoke) 26, a resin bobbin 30, a first coil 23, a substantially inner hollow cylindrical plunger 31, the fixed core 25, a return spring 34, a rod joint 35, a drive spring 37, a stopper ST, and a first terminal 32 (see FIG. 4) for external connection.

The bobbin 30 has a cylindrical tubular shape with first and second flanges 30a and 30b at their respective axial ends. The bobbin 30 is so installed in the first case 26 as to be coaxially mounted at its first flange 30a on the axial bottom of the first case 26 and at its second flange 30b on one outer surface of the core plate 25a. The first coil 23 is wound around the outer wall surface of the bobbin 30.

The core body 25b has one circular end projecting into the bobbin 30 so that a flange of the projecting end of the core body 25b is fitted in one inner circumferential end of the bobbin 30. The projecting end of the core body 25b provides a circular first groove thereinside.

The plunger 31 has a substantially cylindrical shape, and is formed at its one end with a circular second groove; this one end faces the core body 25b. The plunger 31 is slidably installed in the inner hollow portion of the bobbin 30 such that: its second groove coaxially faces the first groove of the core body 25b; and the other end projects through an opening end of the bobbin 30 around the first flange 30a and the inner circumference of the annular bottom of the first case 26.

The return spring 34 is coaxially installed in the bobbin 30 such that both axial ends thereof are fitted in the first and second grooves, respectively. The plunger 31 is biased by the return spring 34 toward a direction opposite to the core body 25b.

One end of the first coil 23 is electrically connected to the first terminal 32 (see FIGS. 2 and 4), and the other end is joined to, for example, the core plate 25a by, for example, welding so as to be grounded. The first terminal 32 is, for example, provided to outwardly project through a resin cover described later. To the first terminal 32, a metal plate 33 as an example of wiring is electrically connected; this metal plate 33 is electrically connected to the idle-reduction ECU 7.

The plunger 31 is formed therein with a substantially cylindrical hole whose bottom corresponds to the one end formed with the second groove. The plunger 31 is formed at its other end with a concave groove communicating with the cylindrical hole. The joint 35 has a substantially cylindrical shape, at its one end with a groove 35a, and at its other end with a flange 35b. The joint 35 is installed in the hole of the plunger 31 such that: the one end projects from the concave groove of the plunger 31, and the flange 35b is in contact with the bottom of the plunger 31.

The stopper ST is designed as, for example, a substantially tubular elastic member, and is mounted in the concave groove of the plunger 31 around the bottom of the projecting portion of the joint 35.

The shift lever 4 has one end and the other end in its length direction. The one end of the shift lever 4 is pivotally linked to the groove 35a of the joint 35. The drive spring 37 is so installed in the hole of the plunger 31 and around the joint 35 as to be limited in elasticity between the stopper ST and the flange 35b. This configuration biases the joint 35 toward the bottom of the plunger 31.

The other end of the shift lever 4 is pivotally coupled to the movable pinion member PM. The shift lever 4 is pivoted about a pivot PI located at its substantially center in the length direction.

When the plunger 31 is shifted in the axial direction of the bobbin 30 in parallel to the axial direction of the motor 2, the shift lever 4 is pivoted so that the movable pinion member PM is shifted in the axial direction of the output shaft 3. The engine is placed such that the shift of the movable pinion member PM allows the pinion 18 to be engaged with a ring gear 36 directly or indirectly coupled to the crankshaft of the engine. For example, the ring gear 36 is directly mounted on the crankshaft of the engine. As an example of the indirect coupling between the ring gear 36 and the crankshaft, the ring gear 36 is coupled to the crankshaft via a motion transfer mechanism, such as a one-way clutch, a torque converter, or the like.

In the structure of the solenoid actuator 5, when the first coil 23 is energized, a magnetic flux is created through a first magnetic circuit consisting of the first case (yoke) 26, the plunger 31, the core body 25b, and the core plate 25a. This magnetizes the core body 25b so that the plunger 31 is pulled into the first coil 23 together with the joint 35 against the elastic force of the return spring 34. This results in that the plunger 31 is in abutment with the core body 25b.

When the first coil 23 is deenergized, the plunger 31 is returned from the first coil 23 by the elastic force of the return spring 34 up to an original position illustrated in FIG. 3.

Next, the structure of the solenoid switch 6 according to the first embodiment will be described hereinafter.

Referring to FIG. 3, the solenoid switch 6 includes the second case yoke) 27, a hollow cylindrical auxiliary yoke 45, the fixed core 25, a resin bobbin 38, a second coil 24, a movable core 39, a rod 51, a magnetic plate 46, a return spring 47, a pair of stationary contacts 41a and 41b, a movable contact 42, a B terminal bolt 48, an M terminal bolt 49, a contact-pressure spring 52, a resin cover 40, and a second terminal 43 for external connection.

The bobbin 38 has a cylindrical tubular shape with first and second flanges 38a and 38b at their respective axial ends. The bobbin 38 is so installed in the second case 27 as to be coaxially mounted at its first flange 38a on the core plate 25a. The second coil 24 is wound around the outer wall surface of the bobbin 38.

The auxiliary yoke 45 is so located around the second coil 24 with an annular clearance therebetween as to be mounted on the inner circumference of the second case 27 and on the magnetic plate 25a. That is, the auxiliary yoke 45 is axially positioned on the magnetic plate 25a.

The core body 25b has the other end projecting into the bobbin 38, which serves as a mounting boss, so that a first annular space is provided between the mounting boss and the inner wall surface of the bobbin 38.

The magnetic plate 46 having a substantially annular shape with a central circular through hole is coaxially mounted at its one outer annular surface on the flange 38b of the bobbin 38 and on the auxiliary yoke 45. That is, the magnetic plate 46 is axially positioned on the auxiliary yoke 45.

The movable core 39 has a substantially cylindrical shape, and is formed at its one end with a mounting boss 39a. The movable core 39 is slidably installed in the inner hollow portion of the bobbin 38 and the circular through hole of the magnetic plate 46 such that:

its one end (mounting boss) 39a coaxially faces the mounting boss of the core body 25b with a space therebetween; and the other end projects through the circular through hole of the magnetic plate 46.

The mounting boss 39a is formed with a second annular space therearound with respect to the inner wall surface of the bobbin 38. The return spring 47 is coaxially installed in the bobbin 38 such that both axial ends thereof are fitted in the first and second annular spaces, respectively. The movable core 39 is biased by the return spring 47 toward a direction opposite to the core body 25b.

One end of the second coil 24 is electrically connected to the second terminal 43 (see FIGS. 2 and 4), and the other end is joined to, for example, the core plate 25a by, for example, welding so as to be grounded. The second terminal 43 is, for example, provided to outwardly project through the resin cover 40. To the second terminal 43, a metal plate 44 as an example of wiring is electrically connected; this metal plate 44 is electrically connected to the idle-reduction ECU 7.

The movable core 39 is formed therein with a substantially cylindrical hole whose bottom is the mounting boss 39a.

The rod 51 has a substantially cylindrical shape, one end of which is fitted in the cylindrical hole of the movable core 39.

The resin cover 40 has a substantially inner hollow cylindrical shape, and has one opening end 40d and the other end (bottom). The resin cover 40 is, for example, fitted in the other opening end of the second case 27 so as to cover the other opening end thereof. The cover 40, the case CA, the front housing 1a, and the end housing 1b constitute a housing assembly of the starter 1.

An inner surface of the bottom of the resin cover 40 is formed at its center with a cylindrical mounting boss 40a axially extending toward the other end of the rod 51 by a first preset length and coaxially facing it. The inner surface of the bottom of the resin cover 40 is also formed with a pair of tubular bolt guides 40b and 40c at both sides of the cylindrical mounting boss 40a. Each of the tubular bolt guides 40b and 40c axially extends toward the magnetic plate 46 by a second preset length greater than the first preset length. An outer surface of the bottom of the resin cover 40, which corresponds to the tubular bolt guide 40b, extends by a preset length in a direction opposite to the direction of the magnetic plate 46; this extending portion corresponds to a part of the tubular bolt guide 40b.

The one opening end 40d of the resin cover 40, which serves as a part of each of the bolts guides 40b and 40c, axially projects in a direction opposite to the bottom of the resin cover 40. This projecting opening end 40d is so fitted in the other opening end of the second case 27 as to be mounted on the other annular surface of the magnetic plate 46. This results in that the resin cover 40 is axially positioned on the magnetic plate 46. The projecting opening end 40d is provided with a recess formed in its outer circumference. The resin cover 40 is fixedly attached to the case CA by crimping the other opening end of the second case into the recess.

The movable contact 42 has a plate-like shape and is made of a conductive material, such as iron or copper. The movable contact 42 is supported on the other end of the rod 51.

The B terminal bolt 48 is electrically connected to a high-side terminal of a battery 54; a low-side terminal thereof is grounded. The B terminal bolt 48 has a head portion and a threaded portion. The B terminal bolt 48 is inserted in the bolt guide 40b from the inner side of the resin cover 40 such that the almost of the threaded portion projects from the bolt guide 40b. A washer 50 is fitted in the projecting portion of the B terminal bolt 48 so that the B terminal bolt 48 is fixed to the bolt guide 40b of the resin cover 40.

The stationary contact 41a having a substantially annular plate-like shape is fitted around the outer circumference of one end of the head portion of the B terminal bolt 48 so that the stationary contact 41a is electrically and mechanically connected to the B terminal bolt 48 via a battery cable BC (see FIG. 4) and is located to face the movable contact 42 and the movable core 39.

The M terminal bolt 49 is electrically connected to one of the blushes 13 of the motor 2; the other of the brushes 13 is grounded. The M terminal bolt 49 has a head portion and a threaded portion. The M terminal bolt 49 is inserted in the tubular bolt guide 40c from the inner side of the resin cover 40 such that the almost of the threaded portion projects from the tubular bolt guide 40c.

The stationary contact 41b having a substantially annular plate-like shape is fitted around the outer circumference of one end of the head portion so that the stationary contact 41b is electrically and mechanically connected to the M terminal bolt 49 via a motor cable MC and is located to face the movable contact 42 and the movable core 39.

Note that the stationary contact 41a and the B terminal bolt 48 can be individually produced and integrated with each other, or integrally produced. Similarly, the stationary contact 41b and the M terminal bolt 49 can be individually produced and integrated with each other, or integrally produced.

The first preset length of the mounting boss 40a and the second preset length of each of the tubular bolt guides 40b and 40c are determined such that each of the stationary contacts 41a and 41b is spaced apart from the movable contact 42 being seated on the mounting boss 40a toward the movable-core side.

The contact-pressure spring 52 is so wound around the outer surface of the mounting boss 40a as to bias the movable contact 42 being seated on the mounting boss 40a toward the movable-core side.

In the first embodiment, an initial load of the return spring 47 is greater than that of the contact-pressure spring 52. Thus, while the solenoid switch 6 is deenergized, the movable contact 42 is seated on the cylindrical mounting boss 40a by the biasing force of the return spring 47 with the contact-pressure spring 52 being compressed.

In the structure of the solenoid switch 6, when the second coil 24 is energized, a magnetic flux is created through a second magnetic circuit consisting of the second case (yoke)

27, the auxiliary yoke 45, the core body 25b, the magnetic plate 46, and the movable core 39 so that the core body 25b is magnetized. This allows the movable core 39 to be pulled into the second coil 24 against the elastic force of the return spring 47 so that the rod 51 is shifted toward the core body 25b together with the movable core 39. Because the movable contact 42 is biased by the compressed contact-pressure spring 52 toward the movable core 39, the movable contact 42 is shifted toward the movable core 39 together with the shift of the rod 51 toward the core body 25b.

When the rod 51 is shifted so that the movable contact 42 is abutted onto the stationary contacts 41a and 41b by a preset pressure based on the elastic force of the contact-pressure spring 52, the stationary contacts 41a and 41b are electrically conducted to each other. This electrical conduction between the stationary contacts 41a and 41b allows the voltage of the battery 54 to be applied to the motor 2 through the brushes 13 and the commutator segments 10.

When the second coil 24 is deenergized, the movable core 39 is returned by the elastic force of the return spring 47 toward the bottom of the resin cover 40 together with the rod 51. After the rod 51 is in contact with the movable contact 42, the rod 51 and the movable contact 42 are integrally shifted toward the mounting boss 40a against the spring force of the contact-pressure spring 52 so that the movable contact 42 is separated from the stationary contacts 41a and 41b. This electrically disconnects the stationary contacts 41a and 41b from each other. Thereafter, the movable contact 42 is seated on the mounting boss 40a by the elastic force of the return spring 47 with the contact-pressure spring 52 being compressed as an original position illustrated in FIG. 3.

The idle-reduction ECU 7 includes a semiconductor relay (switch) R electrically connected between the battery 54 and the first terminal 32 via the metal plate 33. The idle-reduction ECU 7 is also communicably connected to an engine ECU 53 that performs various engine-control tasks.

The various engine-control tasks include: a task for automatically stopping the engine, a task for restarting the stopped engine, a task for controlling a fuel injection quantity and a fuel injection timing for each cylinder, a task for controlling an ignition timing for each cylinder, and a task for controlling an idle speed of the engine. The various engine-control tasks also include a task for controlling the throttle position of a throttle valve of the motor vehicle using drive-by-wire technique, a task for controlling a supercharging pressure of a supercharger of the motor vehicle, a task for controlling the amount of reduction of NOx in the exhaust gas of the engine, a task for controlling operating parameters of valves, such as the opening/closing timing of each valve, and the lift of each valve, and the like.

The task for automatically stopping the engine and the task for restarting the stopped engine will be described later.

Figure 4:
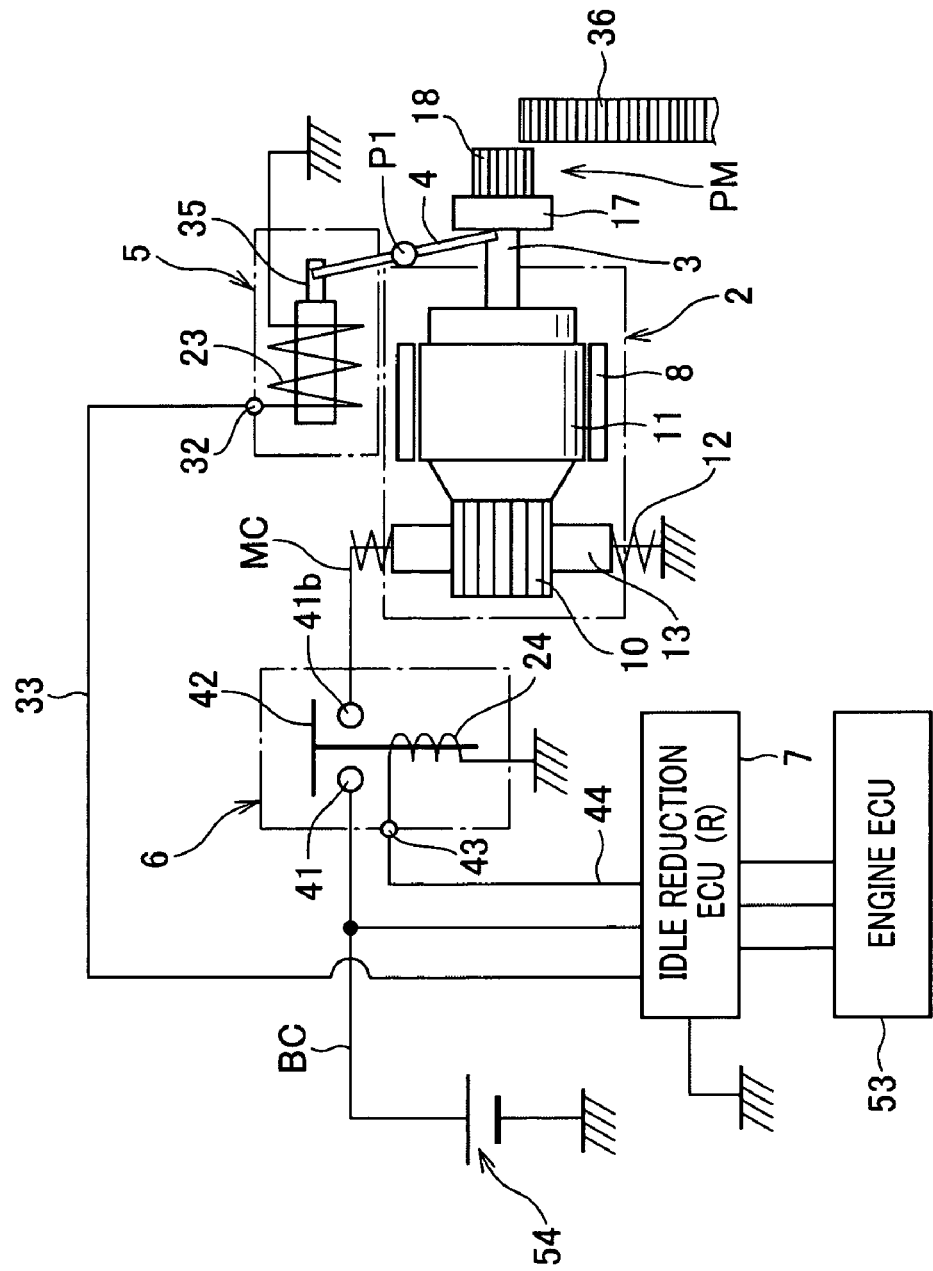
FIG. 4 is an electrical circuit diagram of the starter illustrated in FIGS. 1 to 3.

Referring to FIG. 4, to the idle-reduction ECU 7, for example, a signal indicative of the engine speed, a signal indicative of the shift position of a shift lever (transmission lever) of the motor vehicle, a signal indicative of ON or OFF position of a brake switch of the motor vehicle, and another signal associated with the operating conditions of the engine are repetitively inputted. Based on the signals, the idle-reduction ECU 7 determines whether at least one of predetermined engine automatic stop conditions is met.

Upon determining that at least one of predetermined engine automatic stop conditions is met, the idle-reduction ECU 7 sends an engine automatic stop instruction to the engine ECU 53. In response to the engine automatic stop instruction, the engine ECU 53 carries out an engine automatic stop task. The engine automatic stop task is, for example, to stop the burning of air-fuel mixture in each cylinder of the engine.

The predetermined engine automatic stop conditions include, for example, the following conditions that the shift position of the shift lever is set to a neutral position, the brake switch is set to the ON position (the driver depresses a brake pedal of the motor vehicle), or the engine speed is equal to or lower than a preset speed (idle-reduction execution speed).

During the automatic stop of the engine, when determining that at least one of predetermined engine restart requests occurs based on the signals inputted to the idle-reduction ECU 7, the idle-reduction ECU 7 sends an engine restart instruction to the engine ECU 53, and individually drives the solenoid actuator 5 and the solenoid switch 6 to cause the crankshaft of the engine to be rotated at an initial speed (idle speed). In response to the engine restart instruction, the engine ECU 53 restarts the burning of air-fuel mixture in each cylinder of the engine.

The predetermined engine restart requests can occur when the shift position of the shift lever is set to a drive position, or the brake switch is set to the OFF position (the driver releases the depression of the brake pedal of the motor vehicle).

These operations of the idle-reduction ECU 7 and the engine ECU 53 restart the engine.

Note that the engine ECU 53 has a function of diagnosing whether a fault occurs in the idle-reduction ECU 7 by, for example, monitoring operating conditions of the idle-reduction ECU 7 through a diagnosis communication line D therebetween.

Next, operations of the solenoid device 28 when at least one of the engine restart requests occurs during the engine being decelerated will be described hereinafter with reference to FIGS. 3 and 4.

In response to the at least one of the engine restart requests, the idle-reduction ECU 7 turns on the semiconductor relay R to energize the first coil 23 based on the battery 54 so that the energized first coil 23 creates a magnetic flux that magnetizes the core body 25b. This allows the plunger 31 to be pulled into the first coil 23 toward the core body 25b together with the joint 35 against the elastic force of the return spring 34.

The shift of the joint 35 toward the core body 25b swings the shift lever 4 about the pivot PI such that the one end of the shift lever 4 is shifted toward the core body 25b. This moves the other end of the shift lever 4 toward the ring gear 36 so that the movable pinion member PM is shifted toward the ring gear 36. This allows the pinion 18 to be abutted onto the ring gear 36.

At that time, when the pinion 18 is not engaged with the ring gear 36, the drive spring 37 is pressed to be contracted so that reactive force is charged in the drive spring 37. This biases the pinion 18 toward the ring gear 36. Because the ring gear 36 is turned without an aid of the engine, when the ring gear 36 is turned at a position where the pinion 18 is engageable with the ring gear 36, the reactive force charged in the drive spring 37 causes the pinion 18 to be meshed with the ring gear 36.

After a predetermined time, such as 30 milliseconds (ms), has elapsed since the energization of the first coil 23 by the idle-reduction ECU 7, the idle-reduction ECU 7 energizes the second coil 24 so that the energized second coil 24 creates a magnetic flux that magnetizes the core body 25b. This allows the movable core 39 to be pulled into the second coil 24 against the elastic force of the return spring 47 so that the rod 51 is shifted toward the core body 25b together with the movable core 39. Because the movable contact 42 is biased by the contact-pressure spring 52 toward the movable core 39, the movable contact 42 is shifted toward the movable core 39 together with the shift of the rod 5 toward the core body 25b.

When the rod 51 is shifted so that the movable contact 42 is abutted onto the stationary contacts 41a and 41b by the preset pressure based on the elastic force of the contact-pressure spring 52, the stationary contacts 41a and 41b are electrically conducted to each other. This electrical conduction between the stationary contacts 41a and 41b allows the voltage of the battery 54 to be applied to the armature 11 of the motor 2 via the commutator segments 10 and the blushes 13.

When energized, the armature 11 generates a magnetic field. The generated magnetic field of the armature 11 and the magnetic field generated by the field member 8 rotate the armature 11 relative to the field member 8 to thereby rotate the output shaft 3. The rotation of the output shaft 3 is transferred to the pinion 18 via the clutch 17.

When the pinion 5 is turned based on the rotation of the output shaft 3, because the pinion 18 has been engaged with the ring gear 36, the rotation of the motor 2 is transferred from the pinion 18 to the ring gear 36 so that the crankshaft of the engine is rotated, thus immediately cranking the engine.

In addition, the idle-reduction ECU 7 is a circuit module, such as a single/multi chip module or circuit-board module, in which a control circuit, such as an IC (Integrated Circuit), is installed; this control circuit carries out the engine-automatic stop determining task, the engine-automatic stop instruction sending task, the engine-restart determining task, the engine-restart instruction sending task, and the individual driving task set forth above.

In the first embodiment, as illustrated in FIGS. 1 and 2, the modular idle-reduction ECU 7 is fixedly mounted on the resin cover 40 of the solenoid device 28 with the use of the B terminal bolt 48 and the M terminal bolt 49.

An example of the mounting arrangement of the idle-reduction ECU 7 according to the first embodiment with the use of the B terminal bolt 48 and the M terminal bolt 49 will be described hereinafter.

The modular idle-reduction ECU 7 is comprised of the control circuit and a resin case 7a that encases (encloses) the control circuit, and the starter 1 includes a mount plate 55 integrated with the resin case 7a.

The mount plate 55 is formed with two fit holes designed in line with the B and M terminal bolts 48 and 49. The mount plate 55 is mounted on the resin cover 40 such that a lower part of the threaded portion of each of the B and M terminal bolts 48 and 49, which is close to the resin cover 40, is fitted in a corresponding one of the two fit holes, and an upper part of the threaded portion of each of the B and M terminal bolts 48 and 49 projects therefrom. The modular idle-reduction ECU 7 includes a plurality of terminals electrically connected to the control circuit; these terminals are encapsulated by the resin case 7a.

The starter 1 includes a crimp washer 56 and a nut 57. The crimp washer 56 is fitted around the projecting upper part of the threaded portion of the B terminal bolt 48 to be crimped thereto, and the nut 57 (see FIG. 1) is fitted around the projecting upper part of the threaded portion of the M terminal bolt 49 to be fastened thereto. This results in that the mount plate 55 is fixedly mounted on the resin cover 40.

The fixed mount of the mount plate 55 on the resin cover 40 fixedly attaches the resin case 7a including the modular idle-reduction ECU 7 to the resin cover 40 of the solenoid device 28.

Note that, in the specific example, the resin case 7a of the modular idle-reduction ECU 7 is fixedly mounted on the resin cover 40 through the B terminal bolt 48 and the M terminal bolt 49, but the resin case 7a of the modular idle-reduction ECU 7 can be fixedly mounted on the resin cover 40 with the use of any one of the B terminal bolt 48 and the M terminal bolt 49 in the same manner as the specific example described above. The resin case 7a of the modular idle-reduction ECU 7 can be fixedly mounted on the resin cover 40 using another fixing member.

As illustrated in FIG. 2 by phantom lines, the starter 1 can be provided with a connector 58 integrated with the mount plate 55. The connector 58 includes a plurality of terminals electrically connected to the plurality of terminals of the modular idle-reduction ECU 7; these terminals of the connector 58 can be used to electrically connect the modular idle-reduction ECU 7 to the engine ECU 53.

As described above, the starter 1 according to the first embodiment is configured such that the resin case 7a of the idle-reduction ECU 7 is fixedly mounted on the resin cover 40 of the solenoid device 28 with the use of the B terminal bolt 48 and the M terminal bolt 49. This allows the idle-reduction ECU 7 to be arranged close to the resin cover 40 from which the first and second terminals 32 and 43 are externally taken out.

This configuration of the starter 1 allows the length of each of the metal plates 33 and 44 for electrical connection between the solenoid device 28 and the idle-reduction ECU 7 to be reduced in comparison to the structure of the WO Patent Publication set forth above in which: the switch is disposed to be separated from the controller, and the electromagnetic actuator and the controller are placed on either side of the motor.

Thus, the starter 1 prevents the metal plates 33 and 44 from being broken even if the starter 1 is subjected to frequent vibration due to the engine rotation.

In addition, the configuration of the starter 1 allows part of each of the metal plates 33 and 44 to be buried in the resin case 7a, and the remaining part of each of the metal plates 33 and 44 to be electrically connected to a corresponding one of the terminals 32 and 43 of the solenoid actuator 5 and the solenoid switch 6, which are externally drawn out from the resin cover 40. Thus, in addition to the advantage, the starter 1 facilitates the electrical connection between each of the metal plates 33 and 44 and a corresponding one of the terminals 32 and 43 of the solenoid actuator 5 and the solenoid switch 6.

Even if wires are used as the wiring members for electrical connection between the solenoid device 28 and the idle-reduction ECU 7, the length of each of the wires is reduced in comparison to the structure of the WO Patent Publication set forth above in which: the switch is disposed to be separated from the controller, and the electromagnetic actuator and the controller are placed on either side of the motor.

Thus, the starter 1 prevents the wires from being broken even if the starter 1 is subjected to frequent vibration due to the engine rotation. In addition, even if the starter 1 is installed in the engine room of the motor vehicle, the starter 1 reduces the risk of the wires that may be caught on accessories for the engine placed around the engine and/or on another component placed in the engine room. Accordingly, the starters 1 each having a superior vibration resistance are provided for users.

The configuration of the starter 1 uses the existing terminal bolts 48 and 49 to easily mount the resin case 7a of the idle-reduction ECU 7 on the resin cover 40 without using any new fixing part, such as bases attached to the case CA of the solenoid device 28 for attachment of the resin case 7a. Thus, in comparison to another starter that uses bases attached to the case CA of the solenoid device 28 for attachment of the resin case 7a, the starter 1 reduces the number of its parts required to mount the idle-reduction ECU 7 to the resin cover 40 and facilitates the mount of the idle-reduction ECU 7 thereto. These advantages maintain the cost of the starter 1 at a low level.

Second Embodiment

Figure 5A:
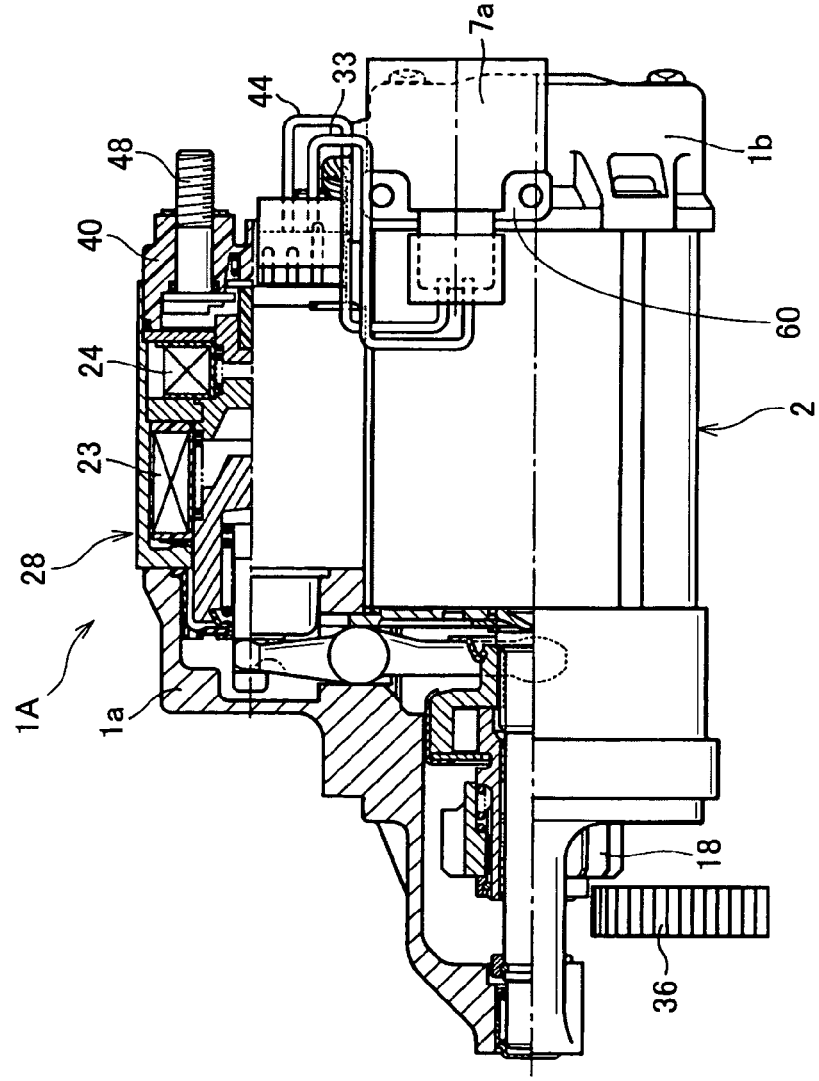
FIG. 5A is a partially axial cross sectional view of a starter according to the second embodiment of the present invention.
Figure 5B:
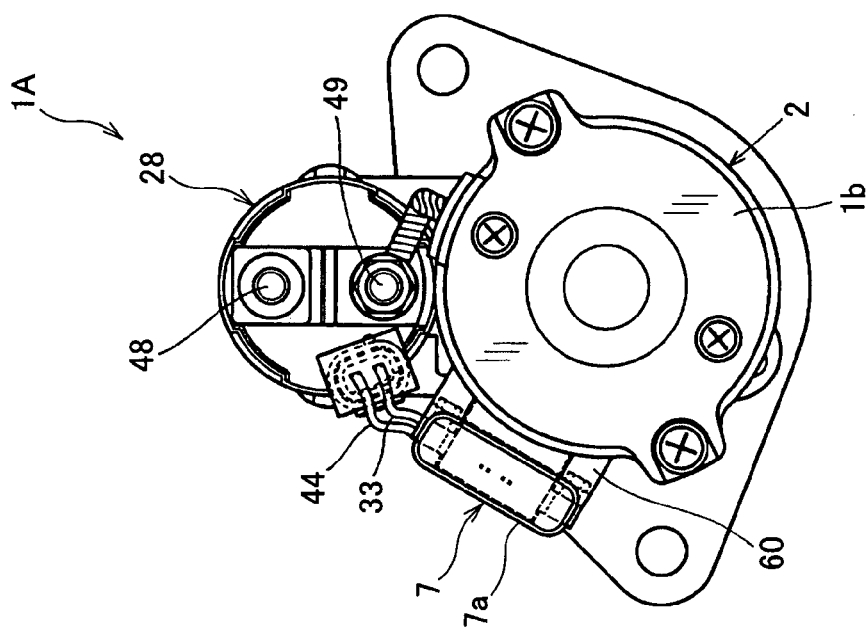
FIG. 5B is a plan view of the starter, when it is viewed from one axial end side of the starter opposite to the other axial end side of the starter close to the internal combustion engine, according to the second embodiment of the present invention.

Referring to FIGS. 5A and 5B, a starter 1A according to the second embodiment of the present invention is configured such that the modular idle-reduction ECU 7 is fixedly mounted on the end housing 1b of the motor 2.

As an example of the mounting arrangement of the idle-reduction ECU 7 according to the second embodiment, a mount 60 is attached to the end housing 1b of the motor 2 by, for example, welding, and the resin case 7a of the idle-reduction ECU 7 is fixedly mounted on the mount 60 by, for example, fastening the resin case 7a to the mount 60 with screws. Note that, in the second embodiment, as the wiring members, wires 33 and 44 are used in place of the metal plates 33 and 44.

This configuration of the starter 1A allows the length of each of the wires 33 and 44 for electrical connection between the solenoid device 28 and the idle-reduction ECU 7 to be reduced in comparison to the structure of the WO Patent Publication set forth above in which: the switch is disposed to be separated from the controller, and the electromagnetic actuator and the controller are placed on either side of the motor.

Thus, the starter 1A prevents the wires 33 and 44 from being broken even if the starter 1 is subjected to frequent vibration due to the engine rotation.

In addition, even if the starter 1A is installed in the engine room of the motor vehicle, the starter 1A reduces the risk of the wires that may be caught on accessories for the engine placed around the engine and/or on another component placed in the engine room. Accordingly, the starters 1A each having a superior vibration resistance are provided for users.

Third Embodiment

Figure 6A:
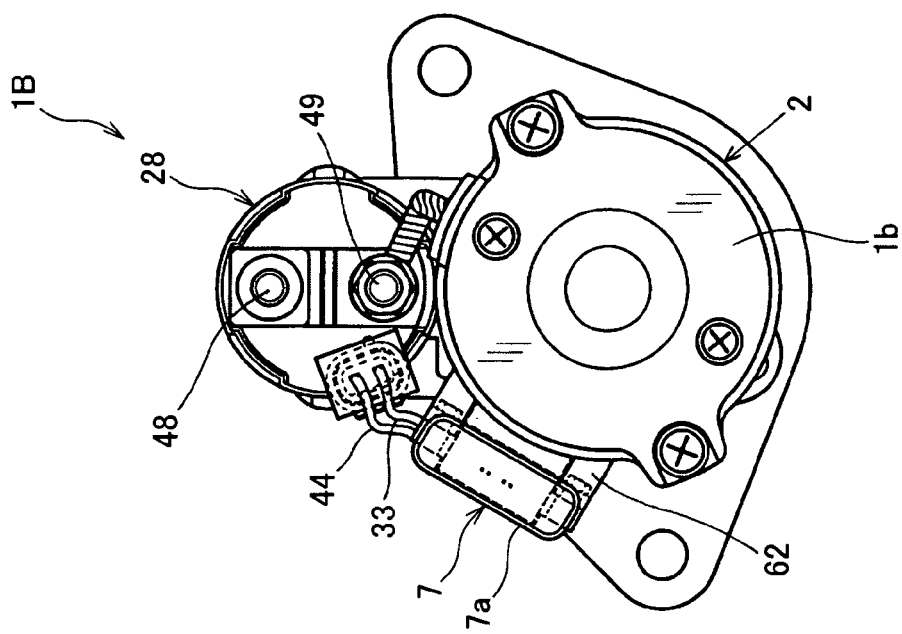
FIG. 6A is a partially axial cross sectional view of a starter according to the third embodiment of the present invention.
Figure 6B:
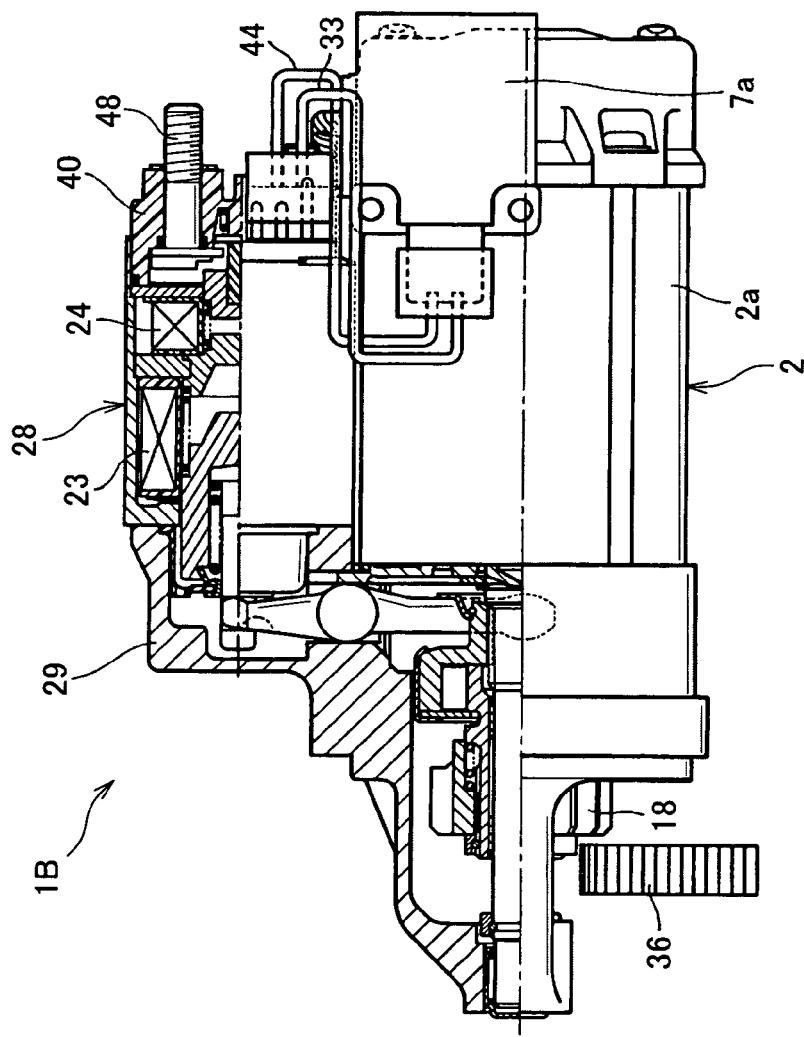
FIG. 6B is a plan view of the starter, when it is viewed from one axial end side of the starter opposite to the other axial end side of the starter close to the internal combustion engine, according to the third embodiment of the present invention.

Referring to FIGS. 6A and 6B, a starter 1B is configured such that the modular idle-reduction ECU 7 is fixedly mounted on the outer annular yoke 2a of the motor 2.

As an example of the mounting arrangement of the idle-reduction ECU 7 according to the third embodiment, a mount 62 is attached to one end of the outer annular yoke 2a of the motor 2 by, for example, welding; this one end is close to the end housing 1b. The resin case 7a of the idle-reduction ECU 7 is fixedly mounted on the mount 62 by, for example, fastening the resin case 7a to the mount 62 with screws. Note that, in the third embodiment, as the wiring members, wires 33 and 44 are used in place of the metal plates 33 and 44.

This configuration of the starter 1B allows the length of each of the wires 33 and 44 for electrical connection between the solenoid device 28 and the idle-reduction ECU 7 to be reduced in comparison to the structure of the WO Patent Publication set forth above in which: the switch is disposed to be separated from the controller, and the electromagnetic actuator and the controller are placed on either side of the motor.

Thus, the starter 1B prevents the wires 33 and 44 from being broken even if the starter 1 is subjected to frequent vibration due to the engine rotation.

In addition, even if the starter 1B is installed in the engine room of the motor vehicle, the starter 1B reduces the risk of the wires that may be caught on accessories for the engine placed around the engine and/or on another component placed in the engine room. Accordingly, the starters 1B each having a superior vibration resistance are provided for users.

Fourth Embodiment

Referring to FIGS. 7 to 11, a starter 1C is configured such that, as an example of controllers according to the present invention, an integrated circuit module 7A as an example of controllers according to the present invention is fixedly mounted on the end housing 1b of the motor 2. The integrated circuit module 7A can be provided at a position between the starter 1C and the engine ECU 53.

In the fourth embodiment, the starter 1C includes a crank angle sensor 65 placed close to the ring gear 36 and operative to cyclically output, to the ECU 40, a signal C2 indicative of the operating condition of the ring gear 36. For example, the crank angle sensor 65 is operative to output a pulsed crank signal each time the crankshaft (ring gear 36) is rotated by a preset crank angle; this pulsed crank signal represents the actual rotational angle or position of the ring gear 36 relative to a reference angle (position). The crank angle sensor 65 can be operative to output a signal indicative of the actual rotational speed of the crankshaft (ring gear 36).

The first coil 23 consists of a suction coil (pull-in coil) and a holding coil. The suction coil is wound around the outer wall surface of the bobbin 30, and the holding coil is wound around the suction coil; this provides a two-layer structure. One end of each of the suction coil and the holding coil is electrically connected to the first terminal 32. The other end of the suction coil is electrically connected to the armature 11 of the motor 2 via the commutator segments 10 and the brushes 13, and the other end of the holding coil is grounded.

As described in the first embodiment, the engine ECU 53 is programmed to carry out a task to output an engine start signal C1 to the integrated circuit module 7A in addition to the various tasks set forth above.

The integrated circuit module 7A can be designed as an integrated circuit module, such as an IC chip, an LSI chip, or a microcomputer chip, or as a circuit-board module on/in which at least one IC chip and circuit elements including resistors, capacitors, and/or coils are mounted. A chip of the IC or LSI chip means a base member on/in which a plurality of circuit components are integrated. Similarly, a circuit board of the circuit-board module means a base member on/in which a plurality of circuit components are integrated.

Preferably, at least one of a plurality of hardware or software circuit elements CE included in the integrated circuit module 7A is designed as an individual module so as to be replaceable with another hardware/software element. Part of the replaceable circuit elements CE is illustrated in FIG. 1.

For example, when the integrated circuit module 7A is a microcomputer circuit, the microcomputer circuit can be designed such that a CPU, an IC, a storage medium, such as a ROM, storing programs, or the like included therein is replaceable with a corresponding functionally identical element.

Like the first embodiment, the integrated circuit module 7A is designed to carry out the engine-automatic stop determining task, the engine-automatic stop instruction sending task, the engine-restart determining task according to the engine start signal C1 outputted from the engine, the engine-restart instruction sending task, and the individual driving task according to at least one of the engine start signal C1 and the signal C2 outputted from the crank angle sensor 65.

In the fourth embodiment, the starter 1C includes a relay 67 separated from the integrated circuit module 7A. The relay 67 consists of, for example, a solenoid 67a and a switch 67b. As the relay 67, a semiconductor relay can be used.

One end of the solenoid 67a is electrically connected to the integrated circuit module 7A, and the other thereof is grounded.

The switch 67b is electrically connected between the positive terminal of the battery 54 and the first terminal 32 of the solenoid actuator 5 via the metal plate 33. The switch 67b is turned on (closed) by magnetic force generated when the solenoid 67a is energized by the integrated circuit module 7A, thus energizing the fist coil 23.

As described in the first embodiment, the energization of the first coil 23 shifts the joint 35 toward the core body 25b to swing the shift lever 4 about the pivot PI, thus moving the other end of the shift lever 4 toward the ring gear 36. This movement shifts the movable pinion member PM toward the ring gear 36 in the axial direction D1 of the output shaft 3 so as to be engageable with the ring gear 36. At that time, because the solenoid switch 6 is deenergized, the motor 2 is not rotated.

In contrast, when deenergized, the switch 67b is kept opened (is off) (see chain double dashed line in FIG. 8) so that no electric power of the battery 54 is supplied to the solenoid actuator 5. This results in that the pinion 18 is kept disengaged with the ring gear 36 (see FIG. 7).

When energized, the solenoid switch 6 establishes the electrical connection between the battery 54 and the armature 11 of the motor 2 so that the motor 2 is turned.

In addition, an ignition switch 70 provided in the motor vehicle is electrically connected to the engine ECU 53. For example, when an ignition key of the motor vehicle is inserted in a key cylinder thereof to be operated by the driver to a start position, a starter ON signal ST is transmitted from the ignition switch 70 to the integrated circuit module 7A via the engine ECU 53 so that the relay 67 is turned on (closed) by the integrated circuit module 7A.

Next, an engine-start control routine to be executed by the integrated circuit module 7A when it is designed as a computer circuit module will be described hereinafter with reference to FIGS. 9 and 10. The integrated circuit module 7A is programmed to repeatedly perform the engine-start control routine stored therein in a given cycle during the running of a main routine as long as either the engine of the motor vehicle is stopped and the vehicle is parked or the engine of the motor vehicle is stopped and the vehicle is decelerated (coasting) by the automatic stop task of the engine ECU 53 set forth above.

Figure 10:
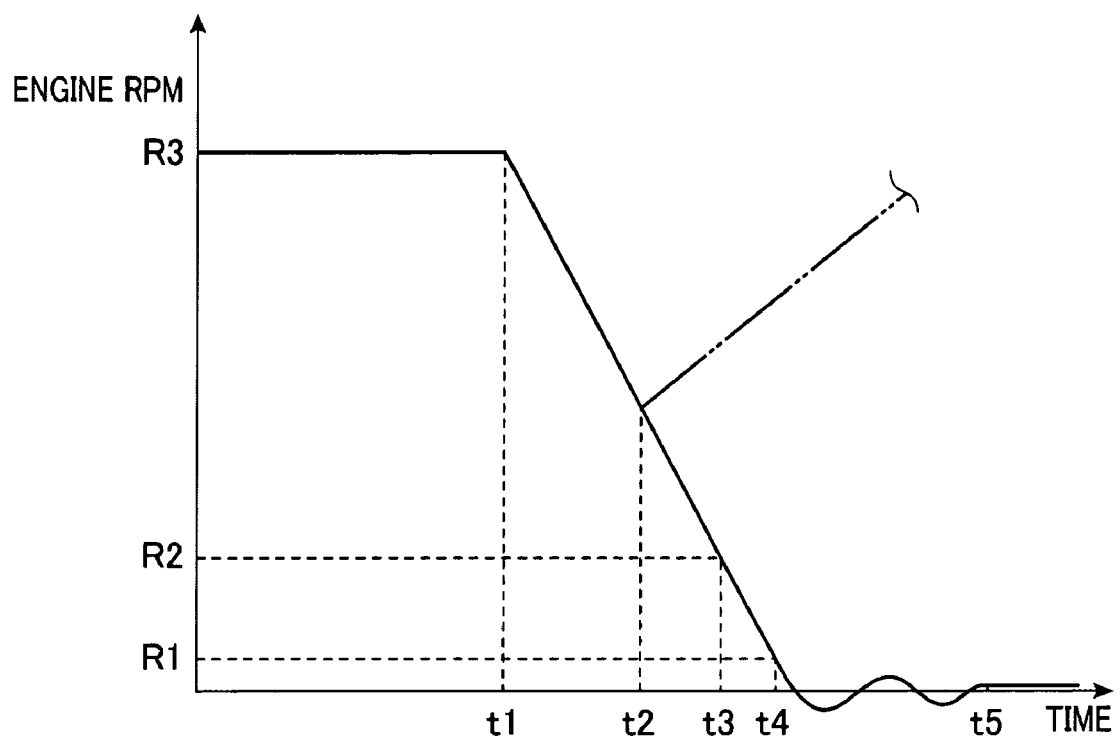
FIG. 10 is a graph schematically illustrating an example of the change of an engine RPM with time according to the fourth embodiment.

For example, when the rotational speed of the crankshaft of the engine (engine speed) is increased as shown in FIG. 10 by chain double dashed line, the engine-start control routine is not carried out.

Figure 9:
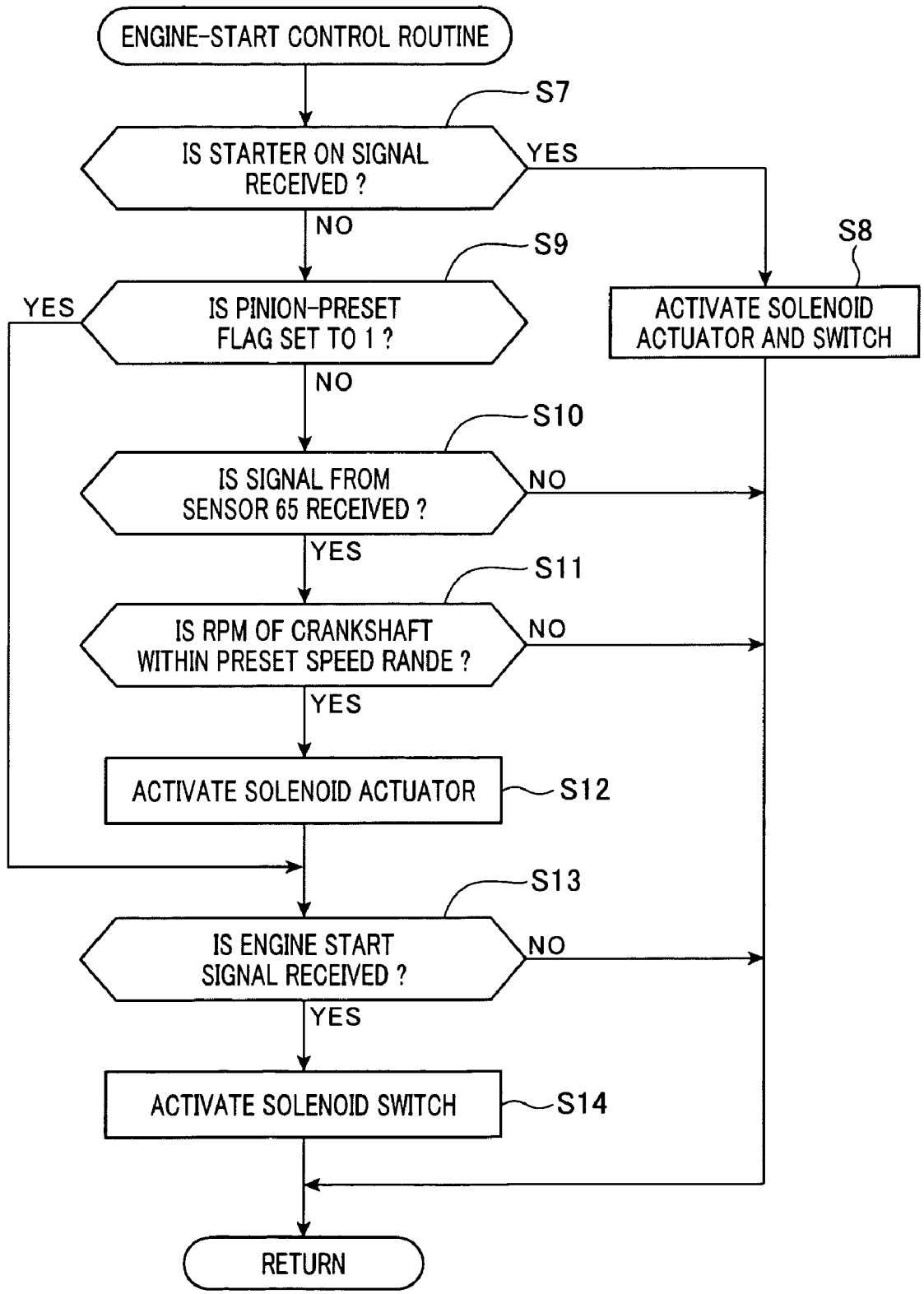
FIG. 9 is a flowchart schematically illustrating an engine-start control routine to be executed by an integrated circuit module illustrated in FIG. 7 according to the fourth embodiment.

When launching the engine-start control routine, the integrated circuit module 7A deter mines whether to receive the starter ON signal ST from the engine ECU 53 in step S7 of FIG. 9.

Upon determining to receive the starter ON signal ST (YES in step S7), the integrated circuit module 7A activates the solenoid actuator 5 to bring the pinion 18 to be meshed with the ring gear 36, and activates the solenoid switch 6 to turn the motor 2 in step S8, thus cranking the engine. Thereafter, the integrated circuit module 7A returns to the main routine.

Otherwise, upon determining not to receive the starter ON signal ST (NO in step S7), the integrated circuit module 7A determines whether a pinion-preset (pre-engagement) flag described later is set to 1 in step S9. The pinion-preset flag represents whether the pinion 18 has been engaged with the ring gear 36.

Upon determining that the pinion-preset flag is not set to 1 (NO in step S9), the integrated circuit module 7A proceeds to step S10, and otherwise, proceeds to step S14.

In step S10, the integrated circuit module 7A determines whether to receive the signal C2 from the crank angle sensor 65.

Upon determining not to receive the signal C2 sent from the crank angle sensor 65 (NO in step S10), the integrated circuit module 7A returns to the main routine.

Otherwise, upon determining to receive the signal C2 sent from the crank angle sensor 65 (YES in step S10), the integrated circuit module 7A determines whether the rotational speed, such as RPM, of the crankshaft (ring gear 36) of the engine is within a preset speed range in step S11.

The preset speed range has been previously determined. For example, in the fourth embodiment, as illustrated in FIG. 10, the range from a value R2 of 400 RPM to a value R1 of 200 RPM is determined as the preset speed range.

In the example illustrated in FIG. 10, the engine is automatically stopped by the engine automatic-stop task by the engine ECU 53 at time t1 in response to, for example, the driver's depression of the brake pedal (the turning on of the brake switch) during the motor vehicle running at a value R3 of 2000 RPM. Thus, the rotational speed of the crankshaft of the engine is decelerated. At time t3, the rotational speed of the crankshaft of the engine reaches the value R2 of 400 (RPM), and thereafter, it reaches the value R1 of 200 RPM at time t4.

After the time t4, the rotational speed of the crankshaft of the engine reaches zero. Thereafter, the rotational speed of the crankshaft fluctuates alternately up and down, in other words, forward rotation and reverse rotation of the crankshaft alternately appear, and finally, reaches zero at time t5 so that the rotation of the crankshaft is stopped.

For example, when the operation in step S11 is executed at time t2, because the value R2 is within the preset speed range (YES in step S11), the integrated circuit module 7A proceeds to step S12, and activates the solenoid actuator 5 to bring the pinion 18 to be meshed with the ring gear 36 so that the pinion preset is completed in step S12. In step S12, the integrated circuit module 7A sets the pinion-preset flag to 1.

Otherwise, when the rotational speed of the crankshaft of the engine is not within the preset speed range (NO in step S11), the integrated circuit module 7A returns to the main routine.

After the operation in step S12 or after the affirmative determination in step S9, the integrated circuit module 7A proceeds to step S13.

In step S13, the integrated circuit module 7A determines whether to receive the engine start signal C1 from the engine ECU 53.

Upon determining not to receive the engine start signal C1 (NO in step S13), the integrated circuit module 7A returns to the main routine.

Otherwise, upon determining to receive the engine start signal C1 (YES in step S13), the integrated circuit module 7A determines that there is at least one of the predetermined engine restart requests occurs, thus activating the solenoid switch 6 to turn the motor 2 in step S14. Because the pinion 18 has been engaged with the ring gear 36, the rotation of the motor 2 cranks the engine, thus restarting it.

Figure 8:
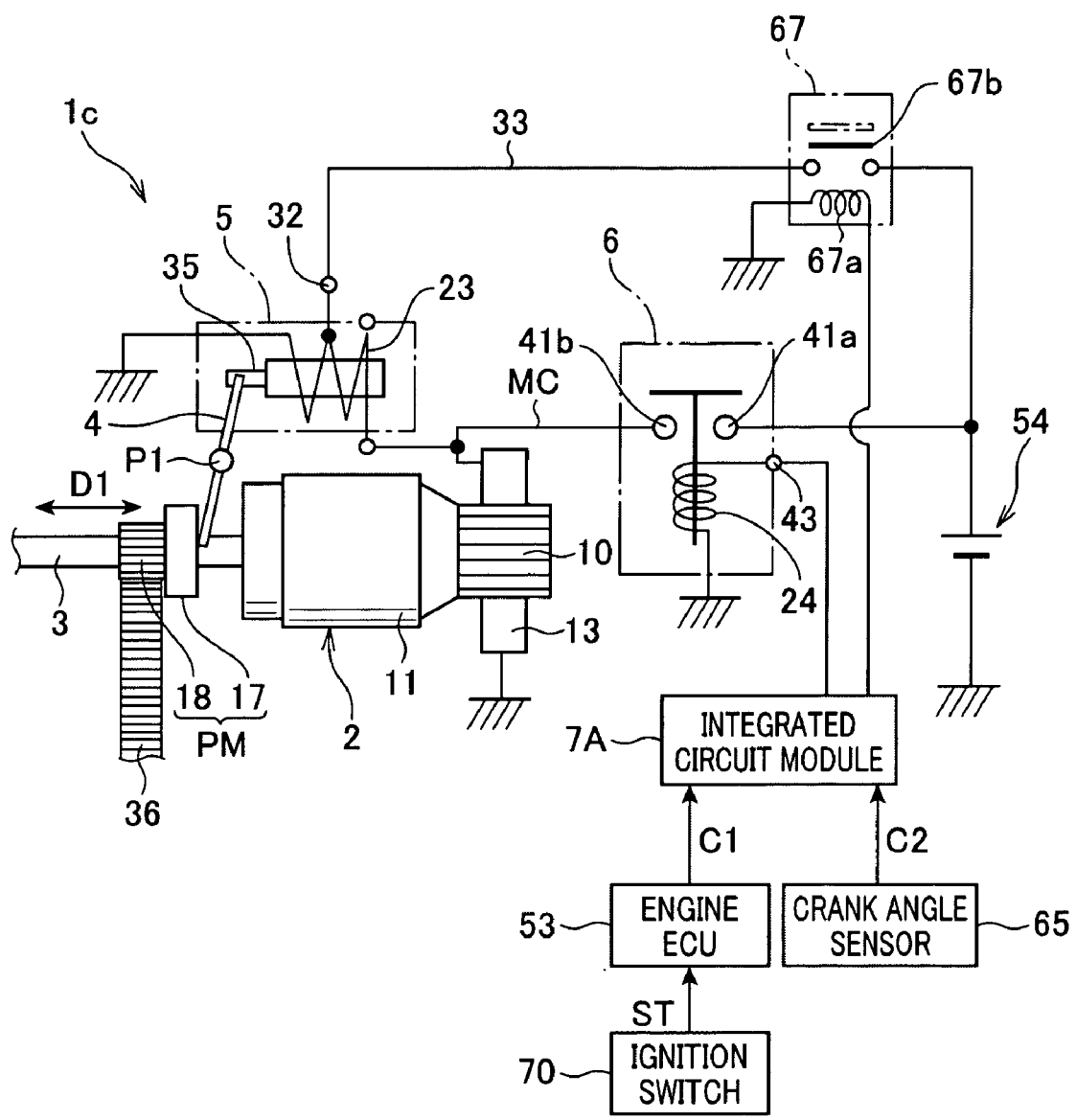
FIG. 8 is an electrical circuit diagram of the starter illustrated in FIG. 7.
Figure 11:
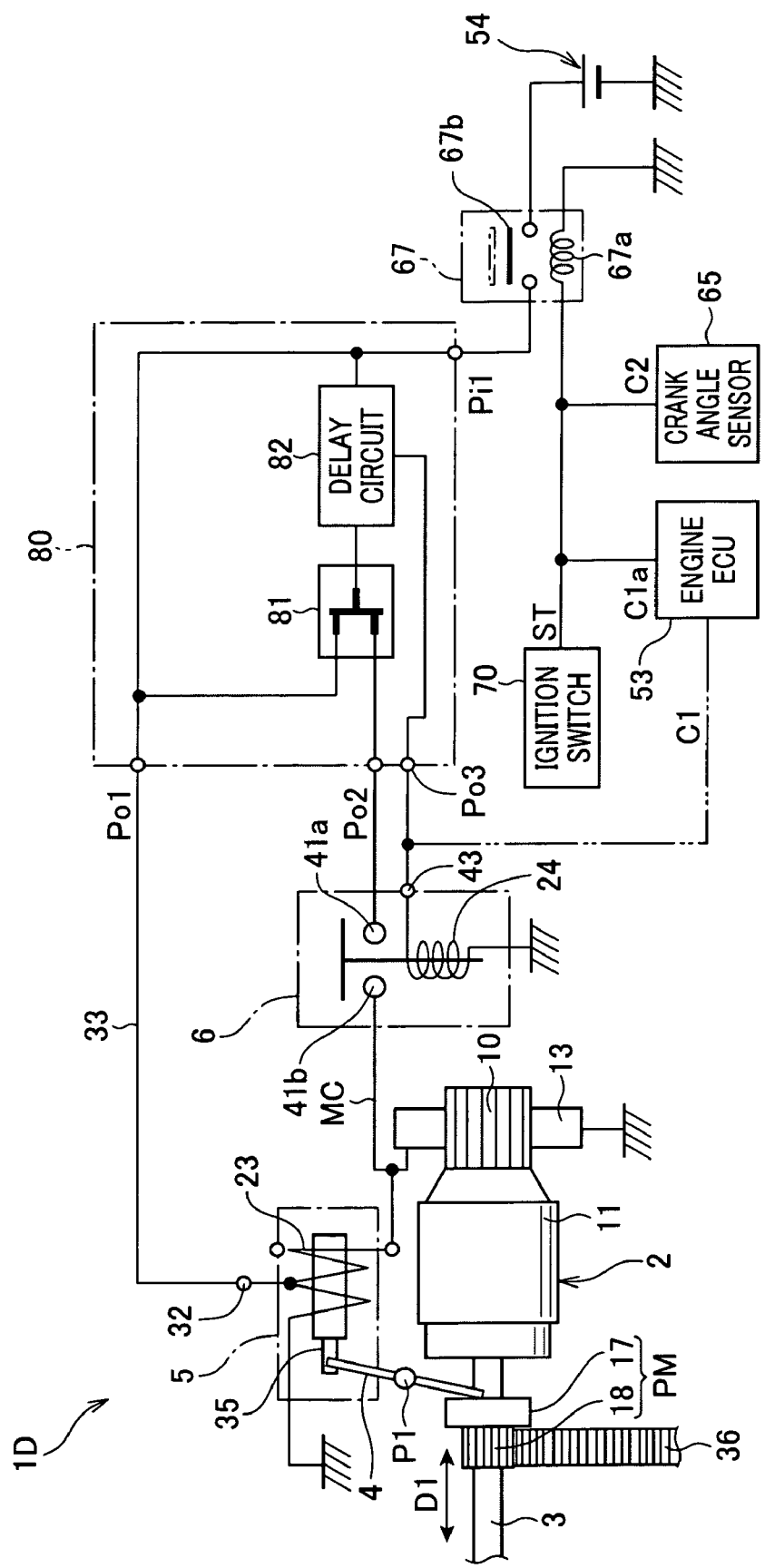
FIG. 11 is a circuit diagram schematically illustrating an example of the structure of a modification of the starter according to the fourth embodiment.
Figure 12:
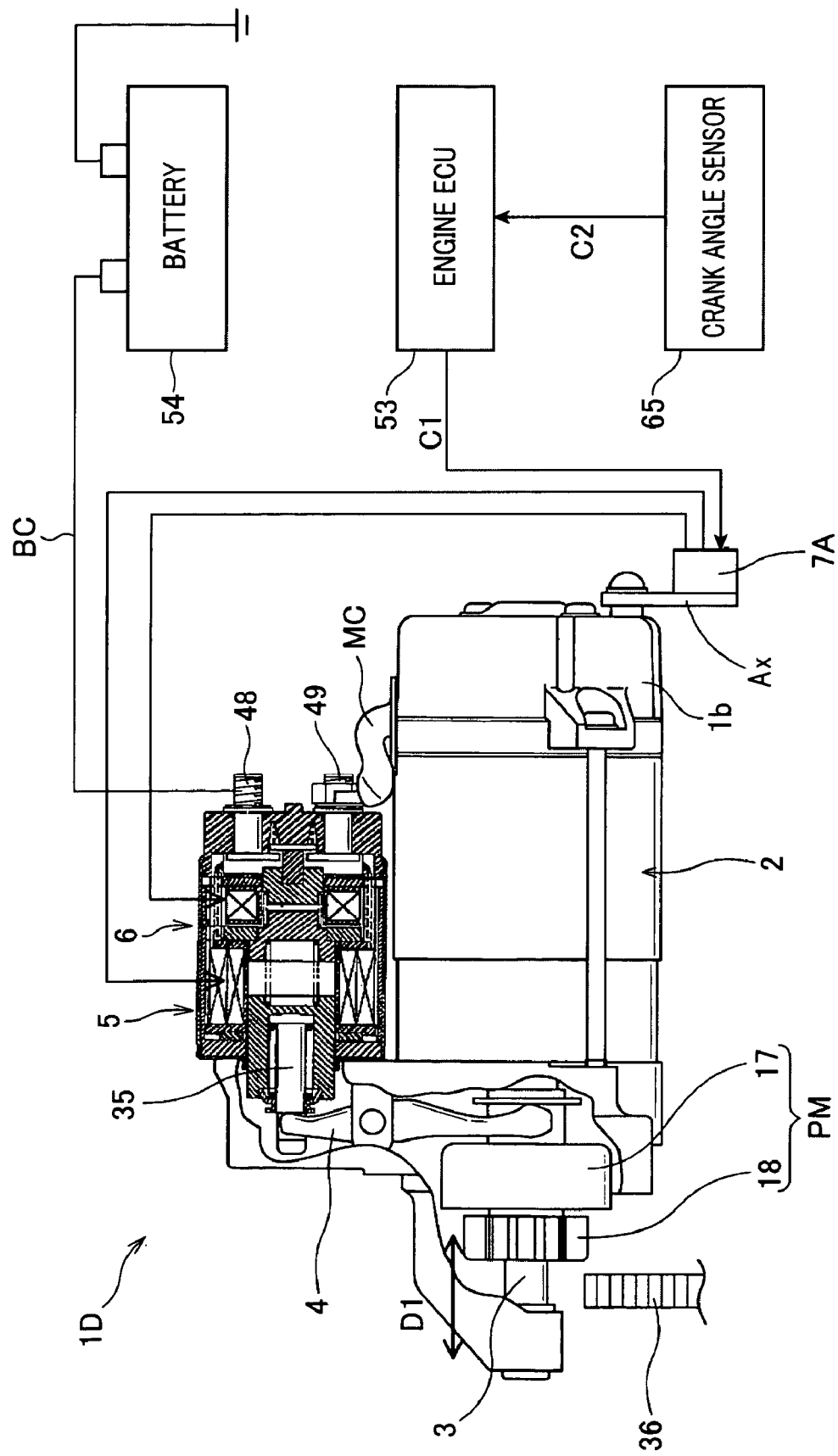
FIG. 12 is a structural view of a starter according to the fifth embodiment of the present invention.

FIG. 11 is an example of the structure of a modification of the starter 1C when the integrated circuit module 7A is designed as a hardwired circuit module 80. In FIGS. 8 and 11, like parts illustrated therebetween, to which like reference characters are assigned, are omitted or simplified in redundant description. In FIG. 11, some of the ground connections in the starter 1C are omitted in illustration; this omission is similarly applied to each of FIGS. 15, 16, 18, and 25.

The integrated circuit module (hardwired circuit module) 80 includes a semiconductor relay 81, a delay circuit 82, an input terminal Pi1, and three output terminals Po1, Po2, and Po3. The semiconductor relay 81 is provided with one control terminal and two connection terminals; the one control terminal works as the coil of a normal mechanical relay, and the two connection terminals works as the main contacts of the normal mechanical relay.

Because such a semiconductor relay has no coils so that no induced electromotive force is created thereby and has no mechanical contacts, measures against noise can be eliminated from the semiconductor relay, so that the semiconductor relay has rapid response to an input via the control terminal.

Specifically, the semiconductor relay 81 energizes between the two connection terminals when a signal, for example, a voltage, is inputted to the one control terminal, and de-energizes therebetween as long as no signals are inputted to the one control terminal.

One of the connection terminals is electrically connected to the output terminal Po1, and the other is to the output terminal Po2. The one control terminal is electrically connected to a first output terminal of the delay circuit 82; a second output terminal of the delay circuit 82 is electrically connected to the output terminal Po3. The output terminal Po1 is electrically connected to the first terminal 32 via the metal plate 33, the output terminal Po2 is electrically connected to the stationary contact 41a of the solenoid switch 6, and the output terminal Po3 is electrically connected to the second terminal 43 of the solenoid switch 6.

The delay circuit 82 is made up of semiconductors, and has an input terminal in addition to the first and second output terminals. The input terminal is electrically connected to the input terminal Pi1; the input terminal Pi1 is electrically connected via the relay 67 to the positive terminal of the battery 54, and connected to the output terminal Po1.

The delay circuit 82 is operative to delay a signal inputted from the input terminal by a preset delay time contained within a range from few ten milliseconds to several hundred milliseconds since the input timing of the signal. Note that the delay circuit 82 is preferably designed such that the preset delay time is changeable to another time.

Each of the engine ECU 53, the ignition switch 70, and the crank angle sensor 65 is electrically connected to the solenoid 67a of the relay 67.

Note that the second terminal 43 of the solenoid switch 6 can be electrically connected to the engine ECU 53.

When the starter ON signal ST sent from the ignition switch 70 is supplied to the solenoid 67a, the relay 67 is turned on (closed) so that power of the battery 54 is inputted from the input terminal. Pi1 to be applied to the first coil 23 via the output terminal Po1. This results in that the solenoid actuator 5 is activated so that the pinion 18 is meshed with the ring gear 36.

Similarly, when an engine start signal or the signal C2 from the crank angle sensor 65 is supplied to the solenoid 67a, the relay 67 is turned on (closed) so that power of the battery 54 is inputted from the input terminal Pi1 to be applied to the first coil 23 via the output terminal Po1. This results in that the solenoid actuator 5 is activated so that the pinion 18 is meshed with the ring gear 36.

The power of the battery 54 inputted from the input terminal Pi1 is inputted to the delay circuit 82 so as to be delayed thereby. Thereafter, the power of the battery 54 is applied to the control terminal of the semiconductor relay 81 so that the semiconductor relay 81 energizes between the two connection terminals. This energization allows the power of the battery 54 inputted from the input terminal Pi1 to be outputted to the output terminal Po2.

At that time, when the starter ON signal is sent to the relay 67, the delay circuit 82 supplies the power of the battery 54 to the second coil 24 via the second terminal 43 and the output terminal Po3 while delaying it from the energization of the first coil 23. This results in that the solenoid switch 6 is turned on so that the motor 2 is driven to rotate the pinion 18 and the ring gear 36, thus cranking the engine.

Thereafter, the delay circuit 82 supplies the delayed pinion engagement signal C1a to the second coil 24 via the second terminal 43 as the engine start signal when at least one of the engine restart requests occurs. Moreover, the engine ECU 53 supplies the engine start signal C1 to the second coil 24 via the second terminal 43 when at least one of the engine restart requests occurs. This results in that the solenoid switch 6 is turned on so that the motor 2 is driven to rotate the pinion 18 and the ring gear 36, thus cranking the engine.

After the pinion 18 has been tightly meshed with the ring gear 36, the pinion 18 and the ring gear 36 are turned by the motor 2. Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

As described above, the starter 1C is comprised of the solenoid device 28, the crank angle sensor 65 for outputting a signal indicative of the operating state of the ring gear 36, the engine ECU 53 for instructing the engine to start, and the integrated circuit module 7A.

The integrated circuit module 7A is designed to determine, based on at least one of the engine start signal C1 from the engine ECU 53 and the signal C2 from the crank angle sensor 65, whether to start the engine (see the operations in steps S10, S11, and S13). The integrated circuit module 7A is also designed to individually activate the solenoid actuator 5 and the solenoid switch 6 in accordance with a result of the determination (see the operations in steps S12 and S14).

As a comparison example with respect to the starter 1C, US Patent Publication NO. 7,275,4509 corresponding to Germany Patent Application Publication No. DE 10 2005 049 942 and to Japanese Patent Application Publication No. 2007-107527 discloses a control system equipped with an engine control unit.

The engine control unit of the control system grasps the rotational speed of an internal combustion engine based on intervals between the pulses of a pulse signal generated by at least one of first and second sensors, and grasps the rotational direction of the crankshaft by utilizing: one of a rising and falling edge of one pulse of the pulse signal of one of the first and second sensors; and a signal level (the base signal level or preset signal level) of the electrical signal of the other of the first and second sensors.

The engine control unit sends control signals to a logic unit based on the rotational speed and rotational direction of the crankshaft. The logic unit activates a first current module to thereby bring a pinion of a motor of the starter to be engaged with a ring gear of the engine, and activates a second current module to thereby rotate the motor of the starter.

However, the logic unit disclosed in the comparison example only plays a passive role in activating the first and second current modules in accordance with a result of the logic combination thereof based on the control signals. In other words, the engine control unit disclosed in the comparison example individually controls the shift of the pinion and the drive of the motor, and therefore, the logic unit cannot individually control the shift of the pinion and the drive of the motor.

In contrast, as described above, the configuration of the starter 1C allows the integrated circuit module 7A to independently determine whether to start the engine based on at least one of the engine start signal C1 and the signal C2, and to activate individually the solenoid actuator 5 and the solenoid switch 6 to thereby control individually the shift of the movable pinion member PM toward the ring gear 36 and the drive of the motor 2.

In addition, such an engine control unit is placed in the engine room such that it is more close to the engine and far away from a starter body (a pinion actuator and a motor-energization switch). Thus, as described in the SUMMARY OF THE INVENTION, relatively long wires (cables) are required for electrically connecting the engine control unit and the starter body. As a result, the frequent vibration due to the engine rotation may cause the wires to become broken. The relatively long wires may also be caught on accessories for the engine placed around the engine and/or on another component placed in the engine room. The relatively long wires may require a time for the transfer of signals between the engine control unit and the starter body, and may increase the resistance of the long wires due to their aging deteriorations. These problems due to the relatively long wires (cables) for electrically connecting the engine control unit and the starter body may take a length of time before the starter receives the control signals that have been outputted from the engine control unit.

However, the integrated circuit module 7A is fixedly mounted on the end housing 1b of the motor 2 close to the solenoid actuator 5 and the solenoid switch 6. This enables the length of each of the metal plates 33 and 44 for electrical connection between the solenoid device 28 and the integrated circuit module 7A to be reduced. Thus, it is possible to solve the problems set forth above due to the relatively long wires (cables) for electrically connecting the engine control unit and the starter body (solenoid device 28).

The integrated circuit module 7A is configured to activate the solenoid actuator 5 so that the pinion 18 is engaged with the rotating ring gear 36 during the rotational speed of the ring gear 36 being decelerated, and to activate the solenoid switch 6 according to the engine start signal C1 to thereby drive the motor 2.

The configuration of the integrated circuit module 7A drives the motor 2 to rotate the pinion 18 with the pinion 18 being meshed with the ring gear 36, making it possible to smoothly crank the engine.

The integrated circuit 7A is designed such that at least one hardware or software element included therein is replaceable with another hardware/software element. Even if the responsivity of the solenoid actuator 5 or the motor 2 is deteriorated due to its aging deteriorations so that an adjustment of the timing of sending the engine start signal and/or pinion engagement signal to the starter 1C is required, it is possible to replace at least one hardware/software element designed to determine the timing of sending the engine start signal and/or the pinion engagement signal without replacing the whole of the engine ECU 53 and changing at least one program module designed to determine the timing of sending the engine start signal and/or the pinion engagement signal.

Thus, it is possible to change at least one hardware/software element included in the integrated circuit module 7A according to the present states of the elements of the starter 1C without increasing cost of the starter 1C, and to reduce the time required to change the at least one program module designed to determine the timing of sending the engine start signal and/or the pinion engagement signal.

The modification of the starter 1C is provided with the delay circuit 82 that delays the activation timing of the solenoid switch 6 relative to the activation timing of the solenoid actuator 5 (see FIG. 11). Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

Fifth Embodiment

A starter 1D according to the fifth embodiment will be described hereinafter with reference to FIGS. 12 to 16.

The structure of the starter 1D according to the fifth embodiment is substantially identical to that of the starter 1C according to the fourth embodiment except for the following points.

Specifically, the first different point is that the crank angle sensor 65 is electrically connected to the engine ECU 53 in place of an integrated circuit module 7B so that the integrated circuit module 7B is designed to receive an engine start signal C1 including: the pinion engagement signal C1$a$ generated by the engine ECU 53 based on the signal C2 sent from the crank angle sensor 65, an engine start instruction C1$b$, and the signal C2.

The second different point is that the integrated circuit module 7B is indirectly attached to the end housing 1b of the starter 1D. For example, in order to address cases where a space around the end housing 1b is narrow so that the integrated circuit module 7B cannot be directly attached to the starter 1D, a mount plate Ax is directly mounted on the end housing 1b, and the integrated circuit module 7B is mounted on the mount plate Ax.

Like the fourth embodiment, the integrated circuit module 7B is designed to carry out the engine-automatic stop determining task, the engine-automatic stop instruction sending task, the engine-restart determining task according to the engine start signal C1, the engine-restart instruction sending task, and the individual driving task according to the engine start signal C1 outputted from the engine ECU 53.

Next, an engine-start control routine to be executed by the integrated circuit module 7B according to the fifth embodiment when it is designed as a computer circuit module will be described hereinafter with reference to FIG. 14. The integrated circuit module 7B is programmed to repeatedly perform the engine-start control routine stored therein in a given cycle during the running of a main routine as long as either the engine of the motor vehicle is stopped and the vehicle is parked or the engine of the motor vehicle is stopped and the vehicle is decelerated (coasting) by the automatic stop task of the engine ECU 53 set forth above.

Figure 14:
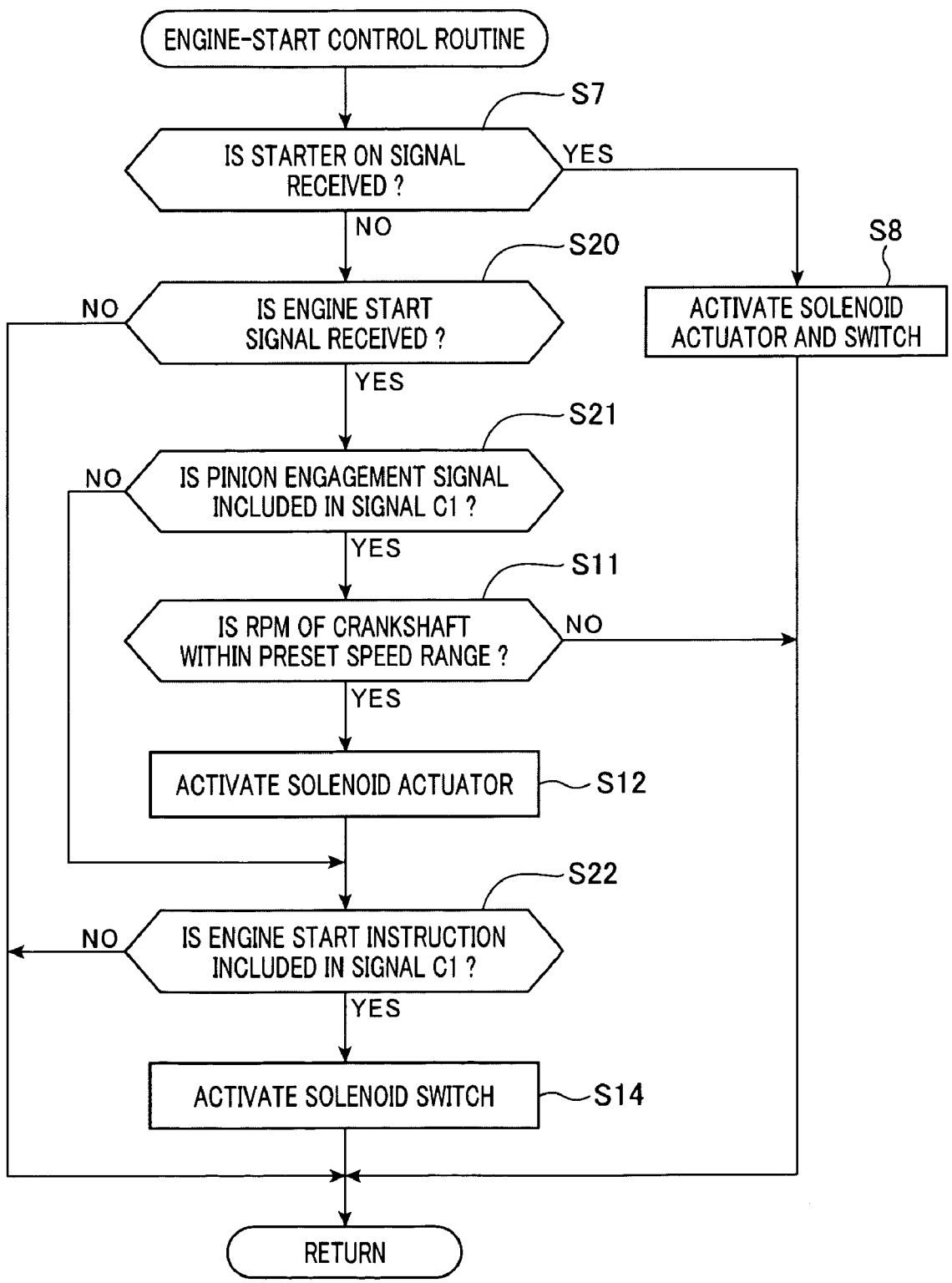
FIG. 14 is a flowchart schematically illustrating an engine-start control routine to be executed by an integrated circuit module illustrated in FIG. 12 according to the fifth embodiment.

When launching the engine-start control routine, the integrated circuit module 7B determines whether to receive the starter ON signal ST from the engine ECU 53 in step S7 of FIG. 14.

Upon determining to receive the starter ON signal ST (YES in step S7), the integrated circuit module 7B carries out the operation in step S8.

Otherwise, upon determining not to receive the starter ON signal ST (NO in step S7), the integrated circuit module 7B determines whether to receive the engine start signal C1 from the engine ECU 53 in step S20.

Upon determining not to receive the engine start signal C1 from the engine ECU 53 (NO in step S20), the integrated circuit module 7B returns to the main routine.

Otherwise, upon determining to receive the engine start signal C1 from the engine ECU 53 (YES in step S20), the integrated circuit module 7B determines whether the pinion engagement signal C1*a* is included in the engine start signal C1 in step S21.

Upon determining that the pinion engagement signal C1*a* is included in the engine start signal C1 (YES in step S21), the integrated circuit module 7B carries out the operations in steps S11 and S12 set forth above.

Specifically, when the rotational speed of the crankshaft of the engine is within the preset speed range (YES in step S11), the integrated circuit module 7B activates the solenoid actuator 5 to bring the pinion 18 to be meshed with the ring gear 36 so that the pinion preset is completed (see step S12).

Otherwise, upon determining that the pinion engagement signal C1*a* is not included in the engine start signal C1 (NO in step S21), or after the operation in step S12, the integrated circuit module 7B proceeds to step S22.

In step S22, the integrated circuit module 7B determines whether the engine start instruction C1*b* is included in the engine start signal C1.

Upon determining that the engine start instruction C1*b* is not included in the engine start signal C1 (NO in step S22), the integrated circuit module 713 returns to the main routine.

Otherwise, upon determining that the engine start instruction C1*b* is included in the engine start signal C1 (YES in step S22), the integrated circuit module 7B deter mines that there is at least one of the predetermined engine restart requests occurs, thus activating the solenoid switch 6 to turn the motor 2 in step S14. Because the pinion 18 has been engaged with the ring gear 36, the rotation of the motor 2 cranks the engine, thus restarting it.

That is, the operations according to the engine-start control routine illustrated in FIG. 14 are substantially identical to those according to the engine-start control routine illustrated in FIG. 9.

Figure 13:
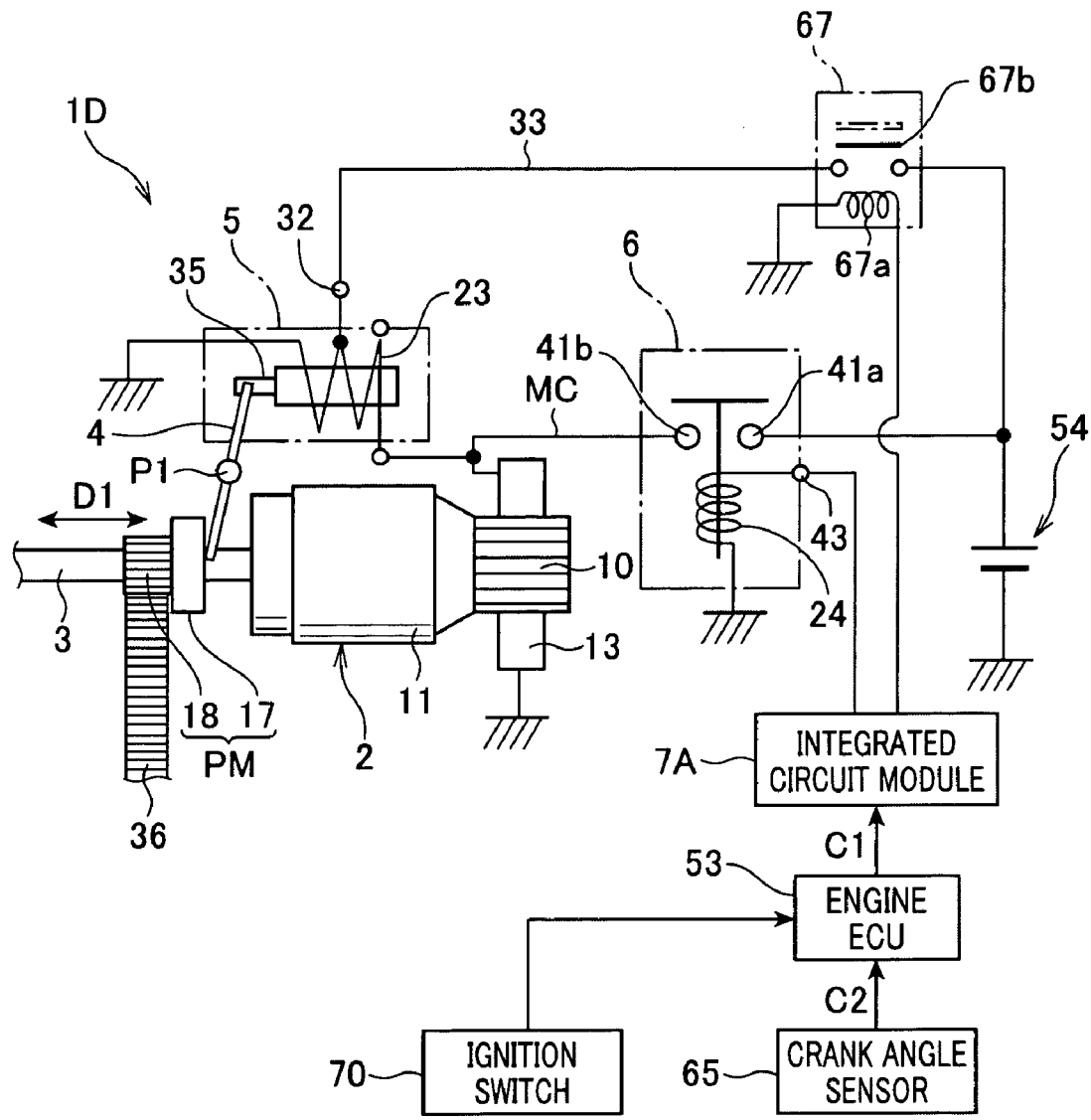
FIG. 13 is an electrical circuit diagram of the starter illustrated in FIG. 12.
Figure 15:
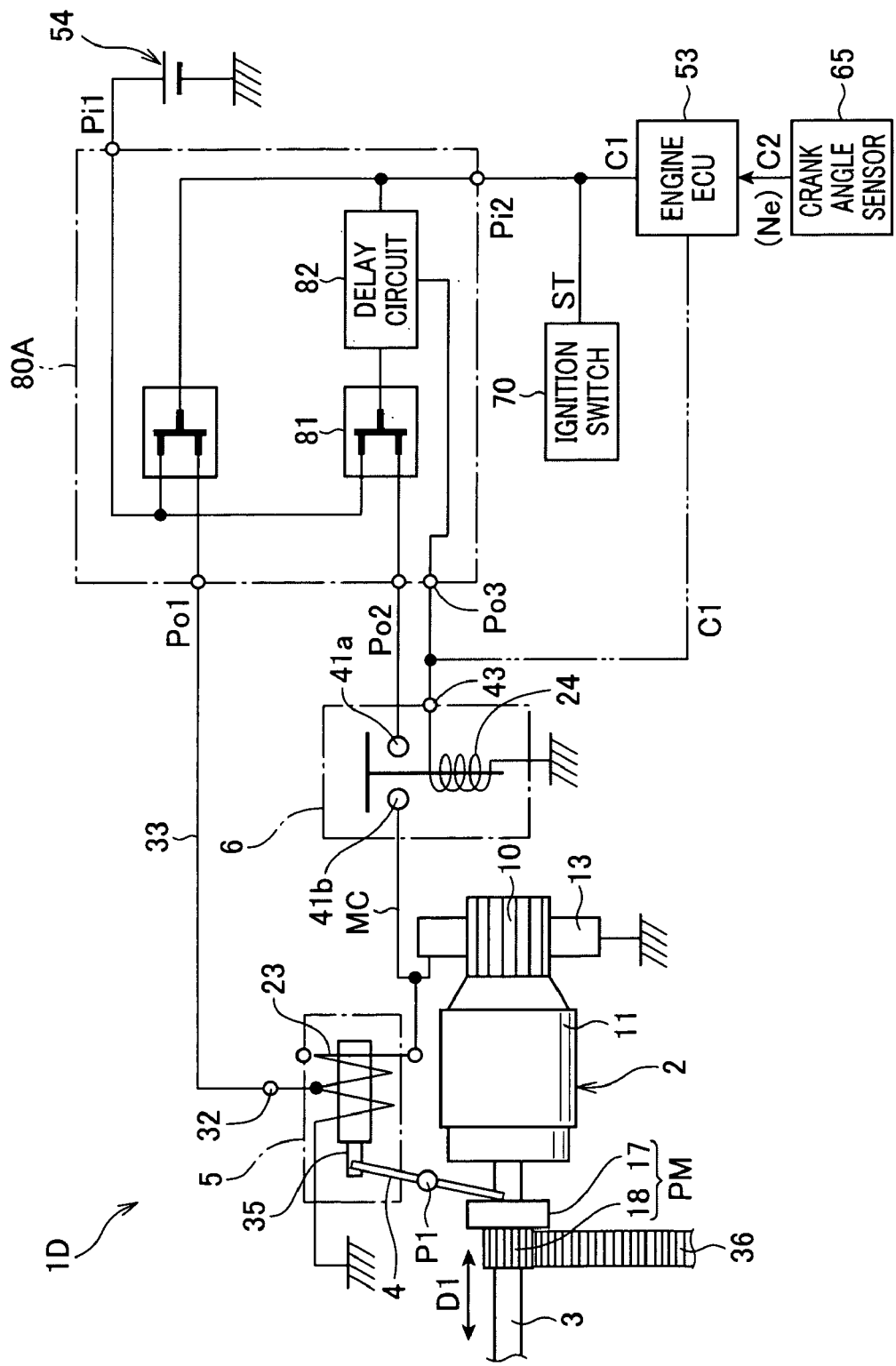
FIG. 15 is a circuit diagram schematically illustrating an example of the structure of the first modification of the starter according to the fifth embodiment.
Figure 16:
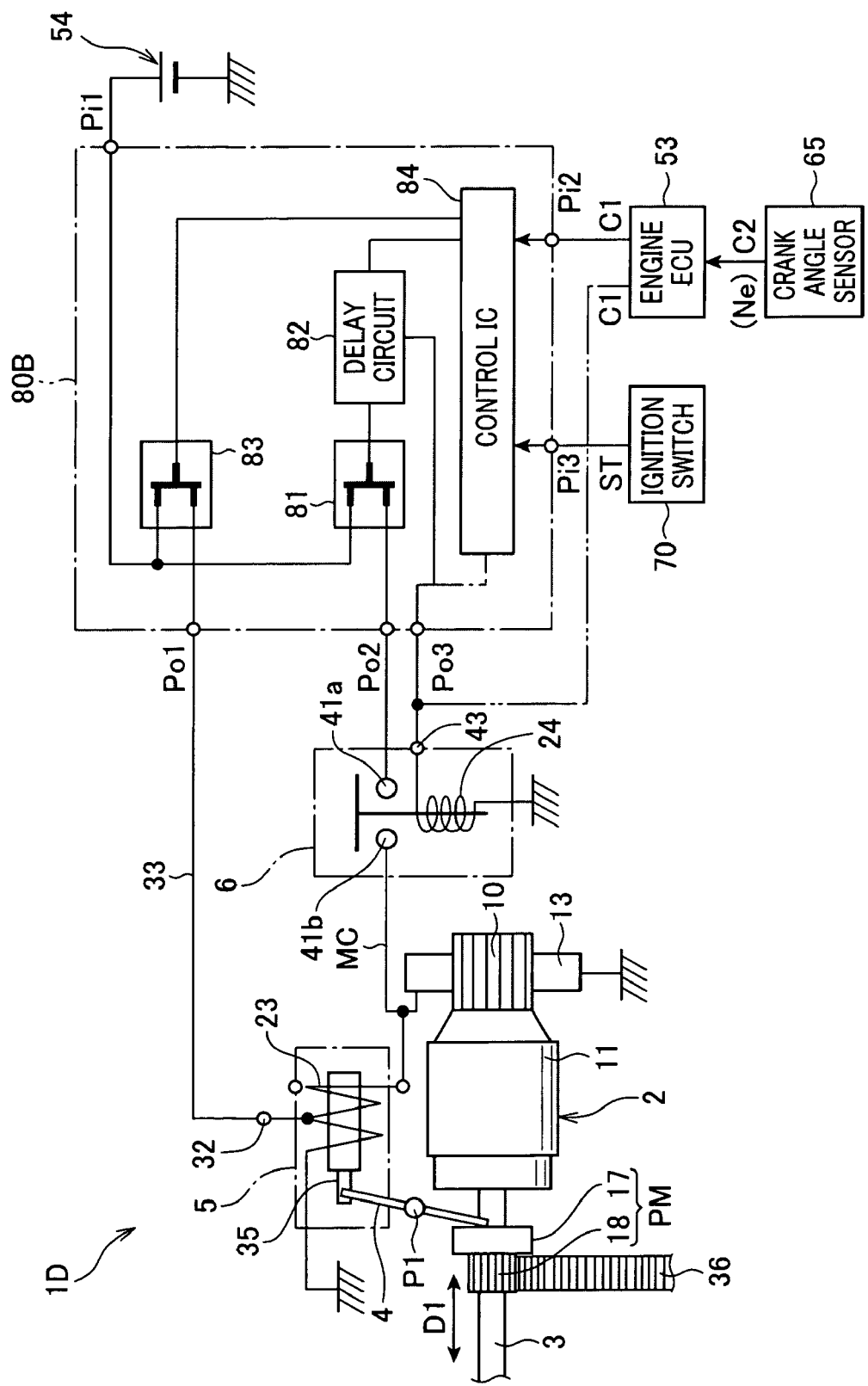
FIG. 16 is a circuit diagram schematically illustrating an example of the structure of the second modification of the starter according to the fifth embodiment.

FIG. 15 is an example of the structure of the first modification of the starter 1D when the integrated circuit module 7B is designed as a hardwired circuit module 80A. FIG. 16 is an example of the structure of the second modification of the starter 1D when the integrated circuit module 713 is designed as a hardwired circuit module 80B. In FIGS. 13, 15, and 16, like parts illustrated therebetween, to which like reference characters are assigned, are omitted or simplified in redundant description.

The integrated circuit module (hardwired circuit module) 80A includes semiconductor relays 81 and 83, the delay circuit 82, two input terminals Pi1 and Pi2, and the three output terminals Po1, Po2, and Po3. Each of the semiconductor relays 81 and 83 is provided with one control terminal and two connection terminals. The semiconductor relay 83 has the same functions as the semiconductor relay 81, and serves as the relay 67.

One of the connection terminals of the semiconductor relay 81 is electrically connected to the output terminal Po2, and the other of the connection terminals of the semiconductor relay 81 and one of the connection terminals of the semiconductor relay 83 are commonly electrically connected to the input terminal Pi1 to which the positive terminal of the battery 54 is electrically connected.

The one control terminal of the semiconductor relay 81 is electrically connected to the first output terminal of the delay circuit 82; the second output terminal of the delay circuit 82 is electrically connected to the output terminal Po3. The other of the connection terminals of the semiconductor relay 83 is electrically connected to the output terminal Po1, and the control terminal of the semiconductor relay 83 is electrically connected to the input terminal Pi2.

The output terminal Po1 is electrically connected to the first terminal 32 via the metal plate 33, the output terminal Po2 is electrically connected to the stationary contact 41*a* of the solenoid switch 6, and the output terminal Po3 is electrically connected to the second terminal 43 of the solenoid switch 6.

The delay circuit 82 has an input terminal in addition to the first and second output terminals. The input terminal of the delay circuit 82 is electrically connected to the input terminal Pi2.

The crank angle sensor 65 is electrically connected to the engine ECU 53. Each of the engine ECU 53 and the ignition switch 70 is electrically connected to the input terminal Pi2. Note that the second terminal 43 of the solenoid switch 6 can be electrically connected to the engine ECU 53.

In contrast, the integrated circuit module (hardwired circuit module) 8013 includes the semiconductor relays 81 and 83, the delay circuit 82, three input terminals Pi1, Pi2, and Pi3, the three output terminals Po1, Po2, and Po3, and a control IC (control circuit) 84. The control IC 84 is operative to control, based on signals inputted thereto from the input terminals Pi2 and Pi3, the semiconductor relay 83 and the semiconductor relay 81 electrically connected thereto via the delay circuit 82.

The electrical connections in the first modification of the relay 1D illustrated in FIG. 15 and those in the second modification of the relay 1D illustrated in FIG. 16 are different from each other in the following points.

The first different point is that the control terminal of the semiconductor relay 83 and the input terminal of the delay circuit 82 are electrically connected to output terminals of the control IC 84. The second different point is that an input terminal of the control IC 84 is electrically connected to each of the input terminals Pi2 and Pi3. The third different point is that the ignition switch 70 is electrically connected to the input terminal Pi3.

When the pinion engagement signal C1*a* included in the engine start signal C1 is supplied to the semiconductor relay 83 via the input terminal Pi2, the semiconductor relay 83 energizes between the two connection terminals so that power of the battery 54 is inputted from the input terminal P11 to be applied to the first coil 23 via the output terminal Po1. This results in that the solenoid actuator 5 is activated so that the pinion 18 is meshed with the ring gear 36.

Thereafter, when the starter ON signal ST is outputted from the ignition switch 70 or the engine start instruction C1*b* included in the engine start signal C1 is outputted from the engine ECU 53, the signal ST or C1*b* is inputted via the input terminal Pi2 (or input terminals Pi2 and Pi3) to the delay circuit 82, and thereafter, the signal ST or C1*b* is inputted to the control terminal of the semiconductor relay 81. This allows the semiconductor relay 81 to energize between the two connection terminals. This energization allows the power of the battery 54 inputted from the input terminal Pi1 to be outputted to the output terminal Po2.

At that time, when the delay circuit 82 supplies the delayed engine start signal C1 to the second coil 24 via the second terminal 43 as the engine start instruction. Moreover, the engine ECU 53 supplies the engine start instruction C1*b* to the second coil 24 via the second terminal 43. This results in that the solenoid switch 6 is turned on so that the motor 2 is driven to rotate the pinion 18 and the ring gear 36, thus cranking the engine.

After the pinion 18 has been tightly meshed with the ring gear 36, the pinion 18 and the ring gear 36 are turned by the motor 2. Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

As described above, the starter 1D is comprised of the solenoid device 28, the crank angle sensor 65 for outputting a signal indicative of the operating state of the ring gear 36, the engine ECU 53 for instructing the engine to start, and the integrated circuit module 7B.

The integrated circuit module 7B is designed to determine, based on the engine start signal C1 from the engine ECU 53, whether to start the engine (see the operations in steps S10, S11, and S22). The integrated circuit module 7B is also designed to individually activate the solenoid actuator 5 and the solenoid switch 6 in accordance with a result of the determination (see the operations in steps S12 and S14).

The configuration of the starter 1D allows the integrated circuit module 7B to independently determine whether to start the engine based on the engine start signal C1, and to activate individually the solenoid actuator 5 and the solenoid switch 6 to thereby control individually the shift of the movable pinion member PM toward the ring gear 36 and the drive of the motor 2.

In addition, the integrated circuit module 7B is fixedly mounted on the end housing 1b of the motor 2 close to the solenoid actuator 5 and the solenoid switch 6. This enables the length of each of the metal plates 33 and 44 for electrical connection between the solenoid device 28 and the integrated circuit module 7B to be reduced. Thus, it is possible to solve the problems set forth above due to the relatively long wires (cables) for electrically connecting the engine control unit and the starter body. The other advantages achieved by the configuration of the starter 1D are substantially identical to those achieved by the configuration of the starter 1C.

Sixth Embodiment

A starter 1E according to the sixth embodiment will be described hereinafter with reference to FIGS. 17 and 18.

The structure of the starter 1E according to the sixth embodiment is substantially identical to that of the starter 1C according to the fourth embodiment except for the following points.

Specifically, the starter 1E is equipped with a rotational position sensor 90 in place of the crank angle sensor 65; this rotational position sensor 90 is directly mounted on the housing of the starter 1E. As the rotational position sensor 90, a resolver or a photoelectric detector can be used. The rotational position sensor 90 is operative to directly detect the operating condition of at least one of the ring gear 36 and the movable pinion member PM and to output a signal C3 indicative of the operating condition of at least one of the ring gear 36 and the movable pinion member PM.

For example, the rotational position sensor 90 is operative to directly detect the actual two-dimensional or three-dimensional position, the actual rotational position, and/or the actual rotational speed of at least one of the ring gear 36 and the movable pinion member PM.

The circuit structure of the starter 1E is substantially identical to that of the starter 1C illustrated in FIG. 2 as long as the crank angle sensor 65 is replaced with the rotational position sensor 90. The engine-start control routine to be executed by the starter 1E is substantially identical to that of the starter 1C illustrated in FIG. 2 as long as the signal C3 is used in place of the signal C2.

As described above, the starter 1E is comprised of the solenoid device 28, the rotational position sensor 90 for outputting a signal indicative of the operating state of at least one of the ring gear 36 and the movable pinion member PM, the engine ECU 53 for instructing the engine to start, and the integrated circuit module 7A.

The integrated circuit module 7A is designed to determine, based on at least one of the engine start signal C1 from the engine ECU 53 and the signal C3 from the rotational position sensor 90, whether to start the engine. The integrated circuit module 7A is also designed to individually activate the solenoid actuator 5 and the solenoid switch 6 in accordance with a result of the determination.

The configuration of the starter 1E allows the integrated circuit module 7A to independently determine whether to start the engine based on at least one of the engine start signal C1 and the signal C3, and to activate individually the solenoid actuator 5 and the solenoid switch 6 to thereby control individually the shift of the movable pinion member PM toward the ring gear 36 and the drive of the motor 2. In addition, the integrated circuit module 7A can determine whether to start the engine based on the signal C3 outputted from the rotational position sensor 90 that directly detects the operating condition of at least one of the ring gear 36 and the movable pinion member PM. For this reason, it is possible to control the start timing of the engine according to the operating condition of the starter 1E and that of the engine.

The other advantages achieved by the configuration of the starter 1E are substantially identical to those achieved by the configuration of the starter 1C. Note that, as illustrated in FIG. 17 by chain double dashed line, the rotational position sensor 90 can be electrically connected to the engine ECU 53 so that the engine ECU 53 receives the signal C3 outputted from the rotational position sensor 90. In this modification, the engine ECU 53 can be designed to output, to the integrated circuit module 7A, the engine start signal C1 including the signal C3 outputted from the rotational position sensor 90. Because the configuration of the modification of the starter 1E is substantially identical to that of the starter 1D according to the fifth embodiment, the modification of the starter 1E can achieve advantages identical to those achieved by the starter 1D.

Figure 17:
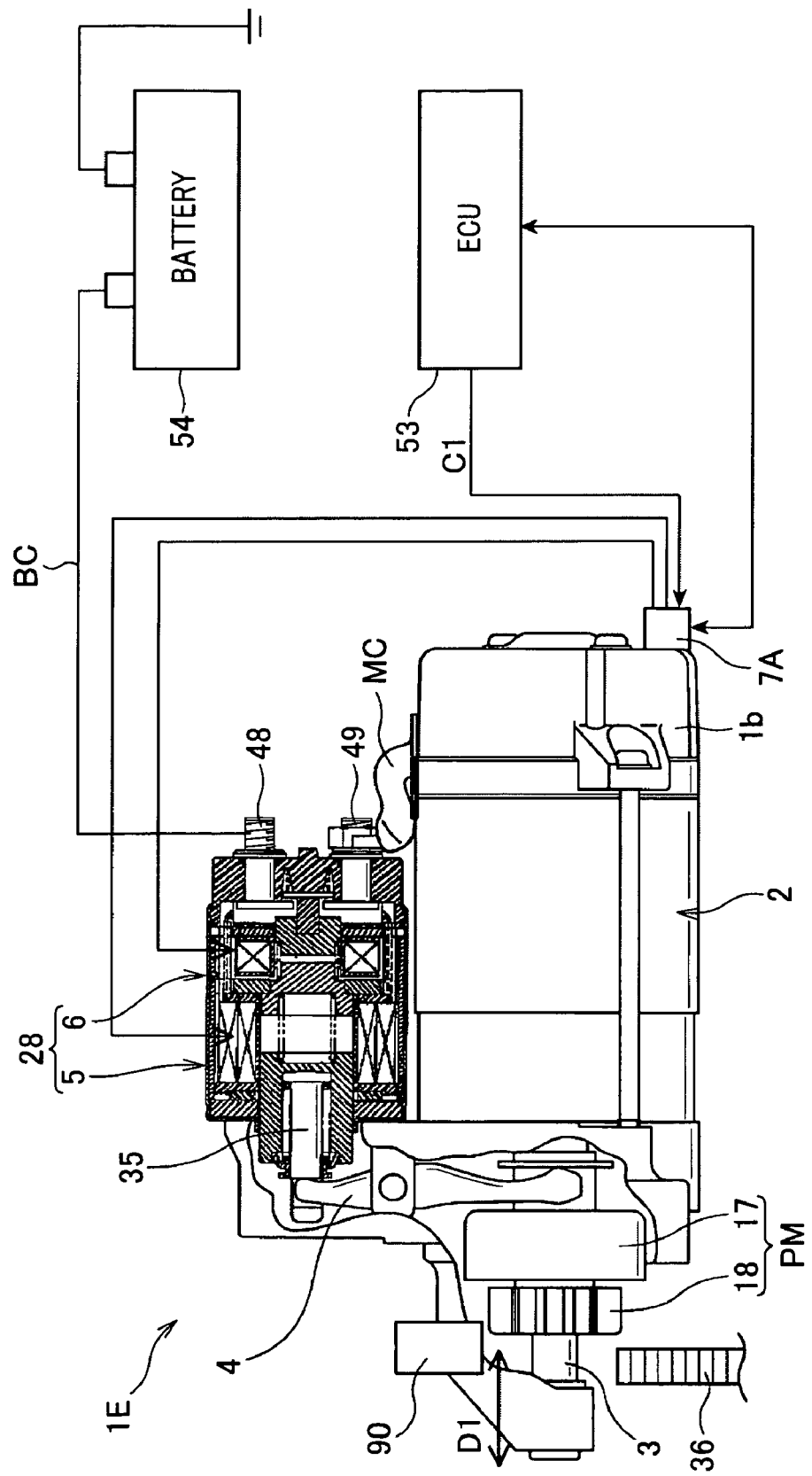
FIG. 17 is a structural view of a starter according to the sixth embodiment of the present invention.
Figure 18:
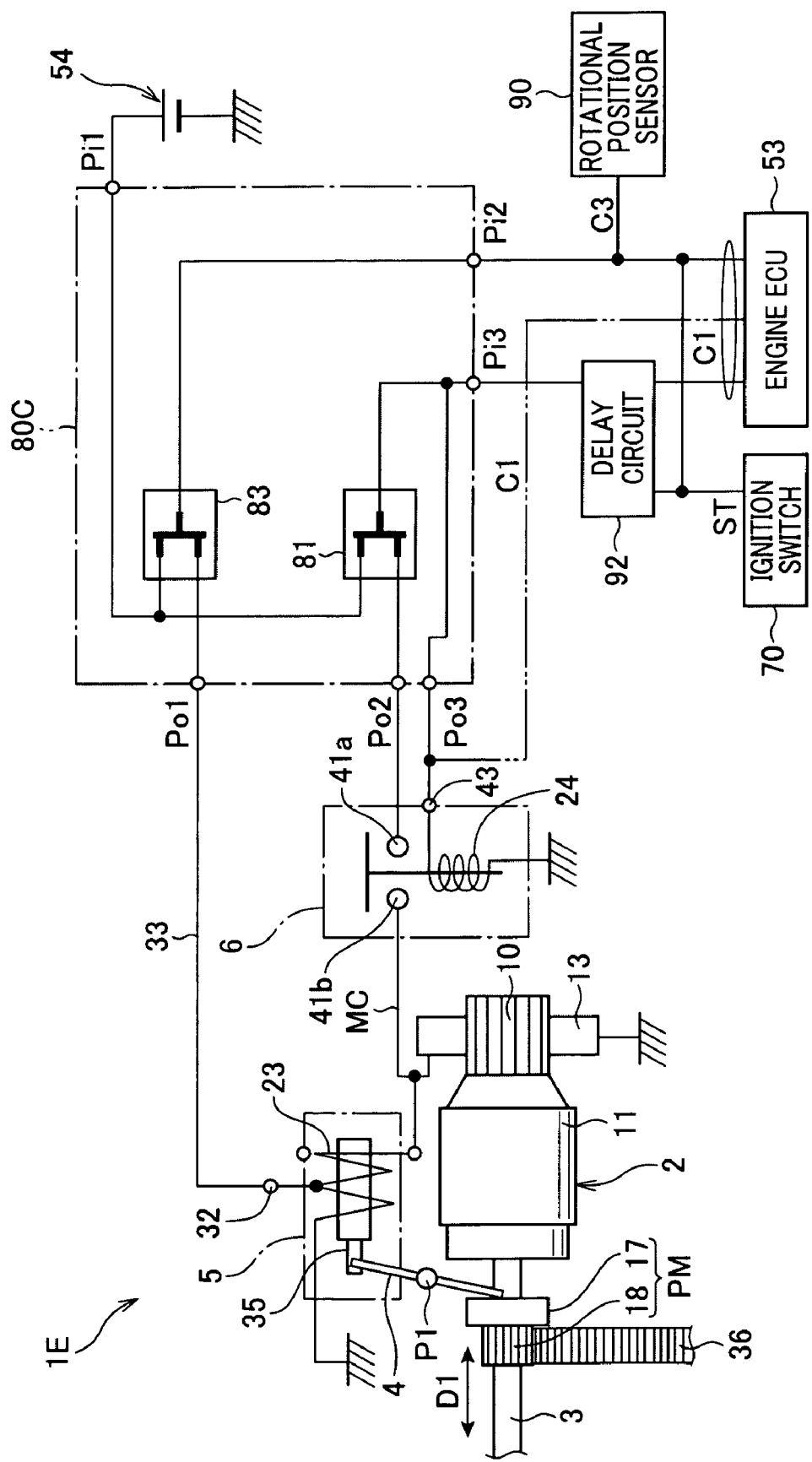
FIG. 18 is a circuit diagram schematically illustrating an example of the structure of a modification of the starter according to the sixth embodiment.

FIG. 18 is an example of the structure of a modification of the starter 1E when the integrated circuit module 7A is designed as a hardwired circuit module 80C. In FIGS. 17 and 18, like parts illustrated therebetween, to which like reference characters are assigned, are omitted or simplified in redundant description.

The integrated circuit module (hardwired circuit module) 80C includes the semiconductor relays 81 and 83 whose functions are identical to the functions of the semiconductor relays 81 and 83 illustrated in FIGS. 15 and 16. A delay circuit 92 is provided out of the integrated circuit module 80C, in other words, the delay circuit 92 having functions identical to those of the delay circuit 82 illustrated in FIG. 11 is provided out of the integrated circuit module 80C. The delay circuit 92 can be comprised of semiconductors or circuit elements including resistors, capacitors, and/or coils.

The integrated circuit module (hardwired circuit module) 80C includes three input terminals Pi1, Pi2, and Pi3, and the three output terminals Po1, Po2, and Po3. Each of the semiconductor relays 81 and 83 is provided with one control terminal and two connection terminals. The semiconductor relay 83 has the same functions as the semiconductor relay 81, and serves as the relay 67.

One of the connection terminals of the semiconductor relay 81 is electrically connected to the output terminal Po2, and the other of the connection terminals of the semiconductor relay 81 and one of the connection terminals of the semiconductor relay 83 are commonly electrically connected to the input terminal Pi1 to which the positive terminal of the battery 54 is electrically connected.

The one control terminal of the semiconductor relay 81 is electrically connected to the input terminal Pi3 to which the output terminal of the delay circuit 92 is electrically connected. The other of the connection terminals of the semiconductor relay 83 is electrically connected to the output terminal Pot, and the control terminal of the semiconductor relay 83 is electrically connected to the input terminal Pi2.

The output terminal Po1 is electrically connected to the first terminal 32 via the metal plate 33, the output terminal Po2 is electrically connected to the stationary contact 41a of the solenoid switch 6, and the output terminal Po3 is electrically connected to the second terminal 43 of the solenoid switch 6.

The delay circuit 92 has two input terminals in addition to the output terminal. The ignition switch 70 and the engine ECU 53 are electrically connected to the input terminals of the delay circuit 92, respectively. The ignition switch 70, the engine ECU 53, and the rotational position sensor 90 are electrically connected to the input terminal. Pi2. Note that the second terminal 43 of the solenoid switch 6 can be electrically connected to the engine ECU 53.

When the pinion engagement signal C1a included in the engine start signal C1 is outputted from the engine ECU 53 or the signal C3 is outputted from the rotational position sensor 90, the pinion engagement signal C1a or the signal C3 is supplied to the semiconductor relay 83 via the input terminal Pi2. Thus, the semiconductor relay 83 energizes between the two connection terminals so that power of the battery 54 is inputted from the input terminal Pi1 to be applied to the first coil 23 via the output terminal Po1. This results in that the solenoid actuator 5 is activated so that the pinion 18 is meshed with the ring gear 36.

Thereafter, when the starter ON signal ST is outputted from the ignition switch 70 or the engine start instruction C1b included in the engine start signal C1 is outputted from the engine ECU 53, the signal ST or C1b is inputted to the delay circuit 82 so as to be delayed thereby. Thereafter, the signal ST or C1b is inputted to the control terminal of the semiconductor relay 81 via the input terminal Pi3. This allows the semiconductor relay 81 to energize between the two connection terminals. This energization allows the power of the battery 54 inputted from the input terminal P11 to be outputted to the output terminal Pot.

At that time, when the delay circuit 80C supplies the delayed engine start instruction C1b to the second coil 24 via the second terminal 43 as the engine start instruction. Moreover, the engine ECU 53 supplies the engine start instruction C1b to the second coil 24 via the second terminal 43. This results in that the solenoid switch 6 is turned on so that the motor 2 is driven to rotate the pinion 18 and the ring gear 36, thus cranking the engine.

After the pinion 18 has been tightly meshed with the ring gear 36, the pinion 18 and the ring gear 36 is turned by the motor 2. Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

Seventh Embodiment

A starter 1F according to the seventh embodiment will be described hereinafter with reference to FIG. 19.

The structure of the starter 1F according to the seventh embodiment is substantially identical to that of the starter 1C according to the fourth embodiment except for the following points.

Specifically, the integrated circuit module 7A is directly or indirectly mounted on a proper portion of the motor vehicle, which exists between the solenoid device 28 (solenoid actuator 5 and the solenoid switch 6) and the engine ECU 53. For example, the integrated circuit module 7A is directly or indirectly mounted on a component placed around the starter 1F, such as a battery, a radiator, or an air cleaner, the vehicle body, the bonnet (engine hood), or the like as the proper portion of the motor vehicle. Preferably, the integrated circuit module 7A is attached to the proper portion of the motor vehicle as close as possible to the solenoid device 28 in order to make short the wiring between the integrated circuit module 7A and each of the solenoid actuator 5 and the solenoid switch 6.

The circuit structure of the starter 1F is substantially identical to that of the starter 1C illustrated in FIG. 2, and the engine-start control routine to be executed by the starter 1F is substantially identical to that of the starter 1C illustrated in FIG. 2. Thus, the starter 1F can achieve advantages identical to those achieved by the starter 1C.

Figure 19:
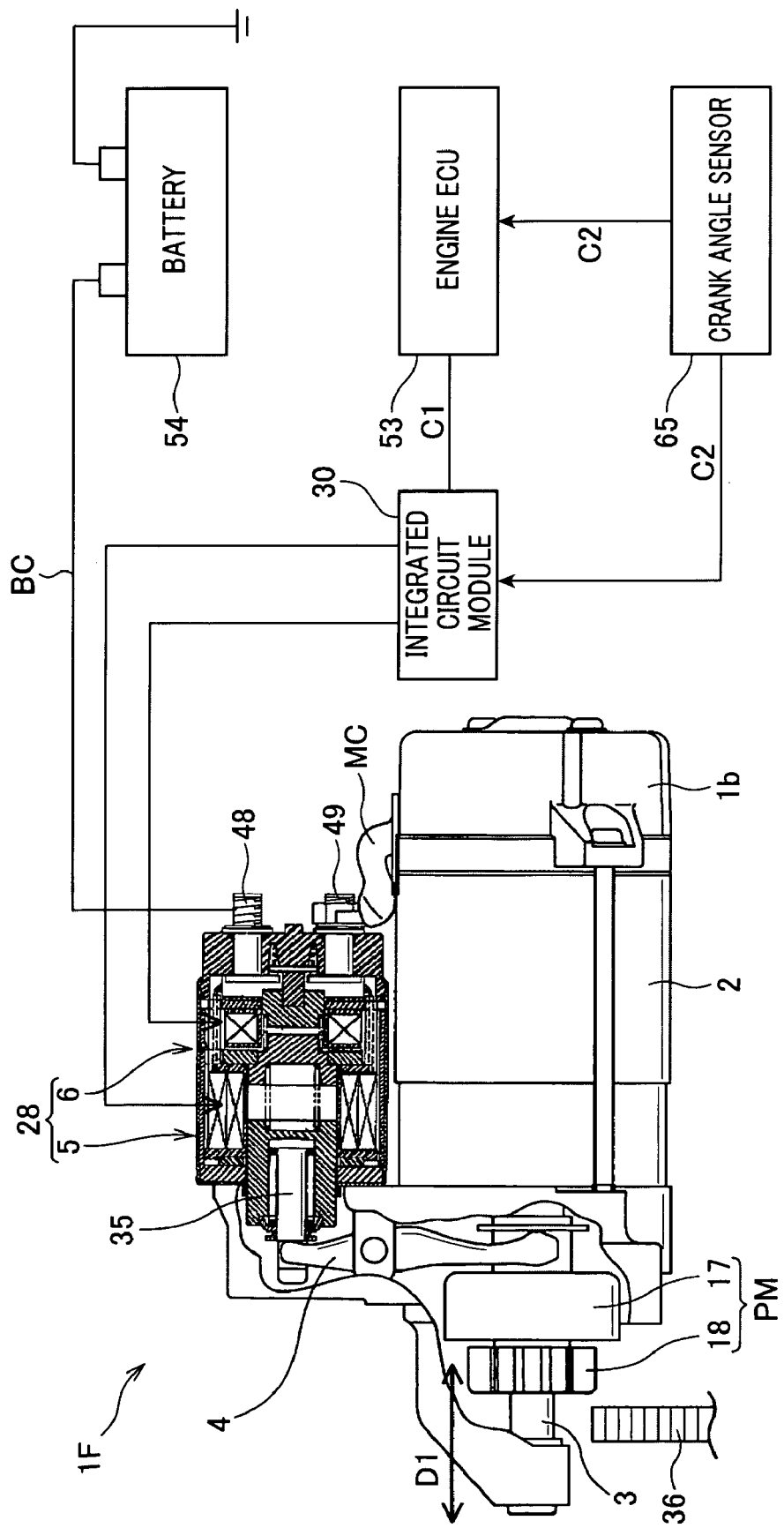
FIG. 19 is a structural view of a starter according to the seventh embodiment of the present invention.

Note that, as illustrated in FIG. 19 by chain double dashed line, the crank angle sensor 65 can be electrically connected to the engine ECU 53 so that the engine ECU 53 receives the signal C2 outputted from the crank angle sensor 65. In this modification, the engine ECU 53 can be designed to output, to the integrated circuit module 7A, the engine start signal C1 including the signal C2 outputted from the crank angle sensor 65. Because the configuration of the modification of the starter 1F is substantially identical to that of the starter 1D according to the fifth embodiment, the modification of the starter 1F can achieve advantages identical to those achieved by the starter 1D.

Eighth Embodiment

A starter 1G according to the eighth embodiment will be described hereinafter with reference to FIGS. 20A to 24; this starter 1G is made up of a pair of a relay integrated circuit module 100 and an electrical insulating coupler 101 as an example of controllers according to the present invention. The structure of the starter 1G according to the eighth embodiment is substantially identical to that of the starter 1C according to the fourth embodiment except for the following points.

Figure 20A:
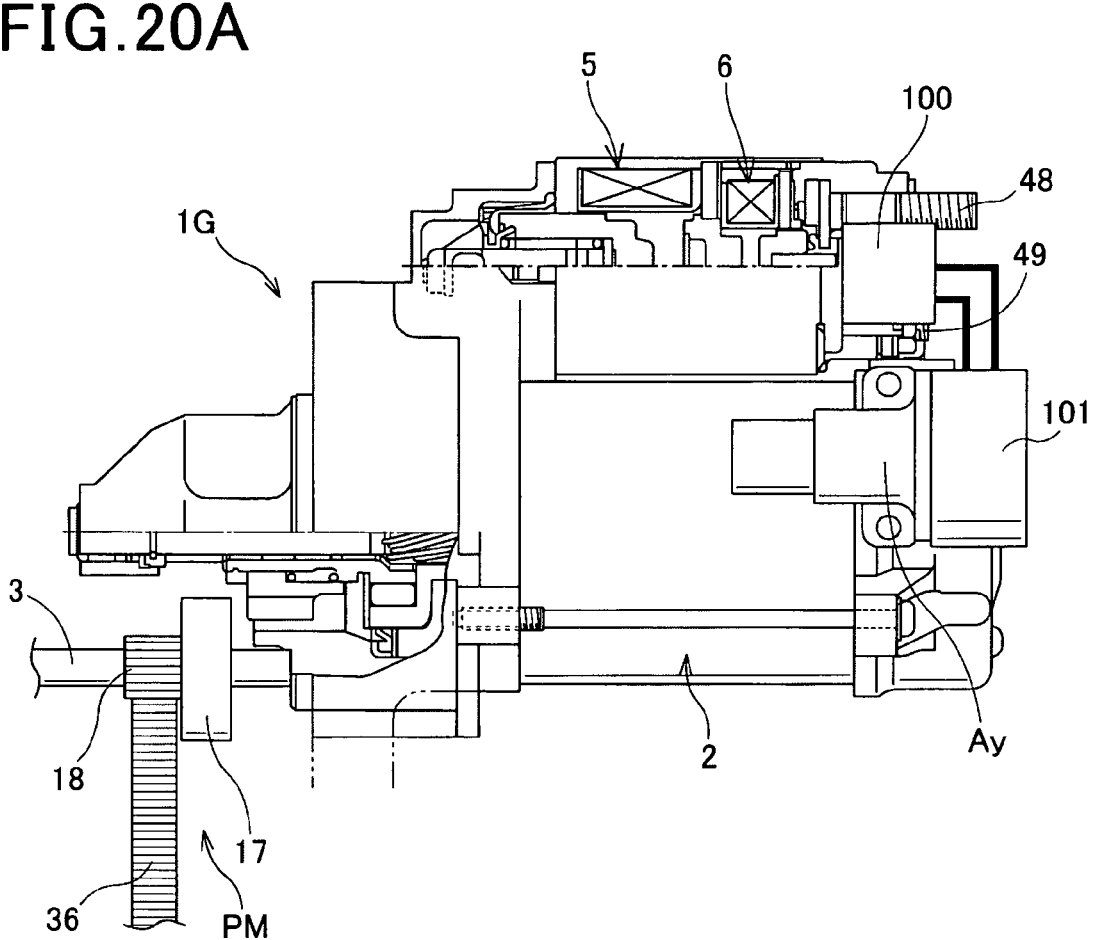
FIG. 20A is a one side view of the starter illustrated in FIG. 19 according to the seventh embodiment of the present invention.
Figure 20B:
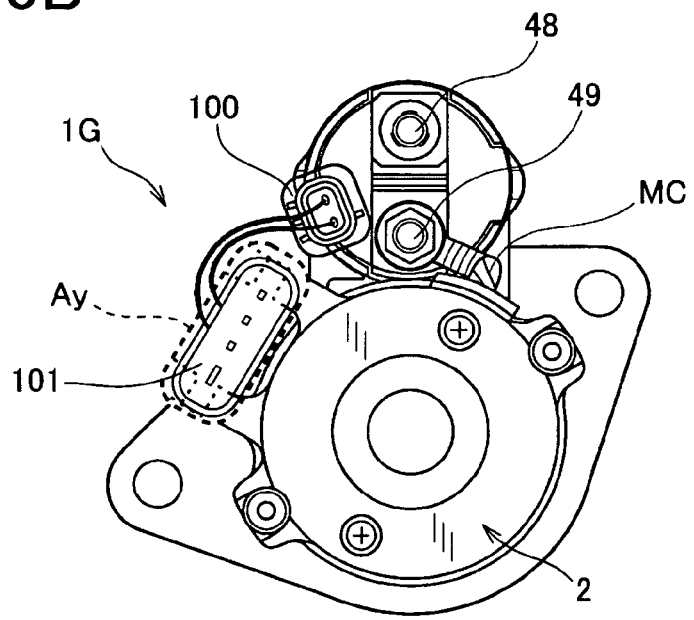
FIG. 20B is a plan view of the starter, when it is viewed from one axial end side of the starter opposite to the other axial end side of the starter close to the internal combustion engine, according to the seventh embodiment of the present invention.

Specifically, as illustrated in FIGS. 20A and 20B, the starter 1G includes the relay integrated circuit module 100 and the electrical insulating connector 101. The relay integrated circuit module 100 is comprised of at least a plurality of semiconductor relays. The number of the semiconductor relays can be freely determined as long as they can individually activate the solenoid actuator 5 and the solenoid switch 6.

The electrical insulating connector 101 is designed to transform the electric signals from the engine ECU 53 by utilizing another energy, such as optical energy, so as to provide coupling with electric galvanic isolation between the input and output terminals thereof. The electric insulating connector 101 can be made up of a plurality of electrical insulating elements with low cost, such as a plurality of photocouplers, a plurality of magnetic coupling elements (coils or transformers), a plurality of isolation amplifiers, a plurality of resistors, a plurality of capacitive elements, such as capacitors, or the like. In the eighth embodiment, the electric insulating connector 101 is made up of a plurality of photocouplers 102 (see FIG. 23).

The relay integrated circuit module 100 is directly mounted on the end housing 1b of the solenoid device 28 by a given method of mounting.

Preferably, the relay integrated circuit module 100 is directly mounted in a recess formed in a surface of the end housing 1b of the housing of the solenoid device 28; this is little affected by heat generated by the engine. The electrical insulating connector 101 is directly mounted on the end housing 1b of the solenoid device 28 via a mount member Ay.

As the mount member Ay, the mount plate Ax can be used, or a housing for containing components can be used. Note that FIGS. 20A and 20B illustrate an example of the mounting of each of the relay integrated circuit module 100 and the electrical insulating connector 101, and therefore, each of the relay integrated circuit module 100 and the electrical insulating connector 101 can be freely mounted on a given portion of the starter 1G.

Similar to the integrated circuit module 7A, the relay integrated circuit module 100 and the electrical insulating connector 101 are placed between the starter body (solenoid device 28) and an ECU. As the ECU, the engine ECU 53 can be used, or an idle-reduction ECU 53a (see FIG. 22) designed to specifically implement functions associated with the idle reduction control independently from an engine ECU 53b as well as the idle-reduction ECU 7 according to the first embodiment can be used.

The plurality of semiconductor relays installed in the relay integrated circuit module 100 are designed to be individually activated by corresponding drive signals outputted from the ECU 53 or 53a. For example, the ECU 53 illustrated in FIG. 21 includes a start control section 53s that implements the engine-start control routine illustrated in FIG. 9 or 14, and the starting control section 53s is operative to output the drive signals to the respective semiconductor relays installed in the relay integrated circuit module 100 (see steps S12 and S14 in FIG. 9 or 14).

Figure 21:
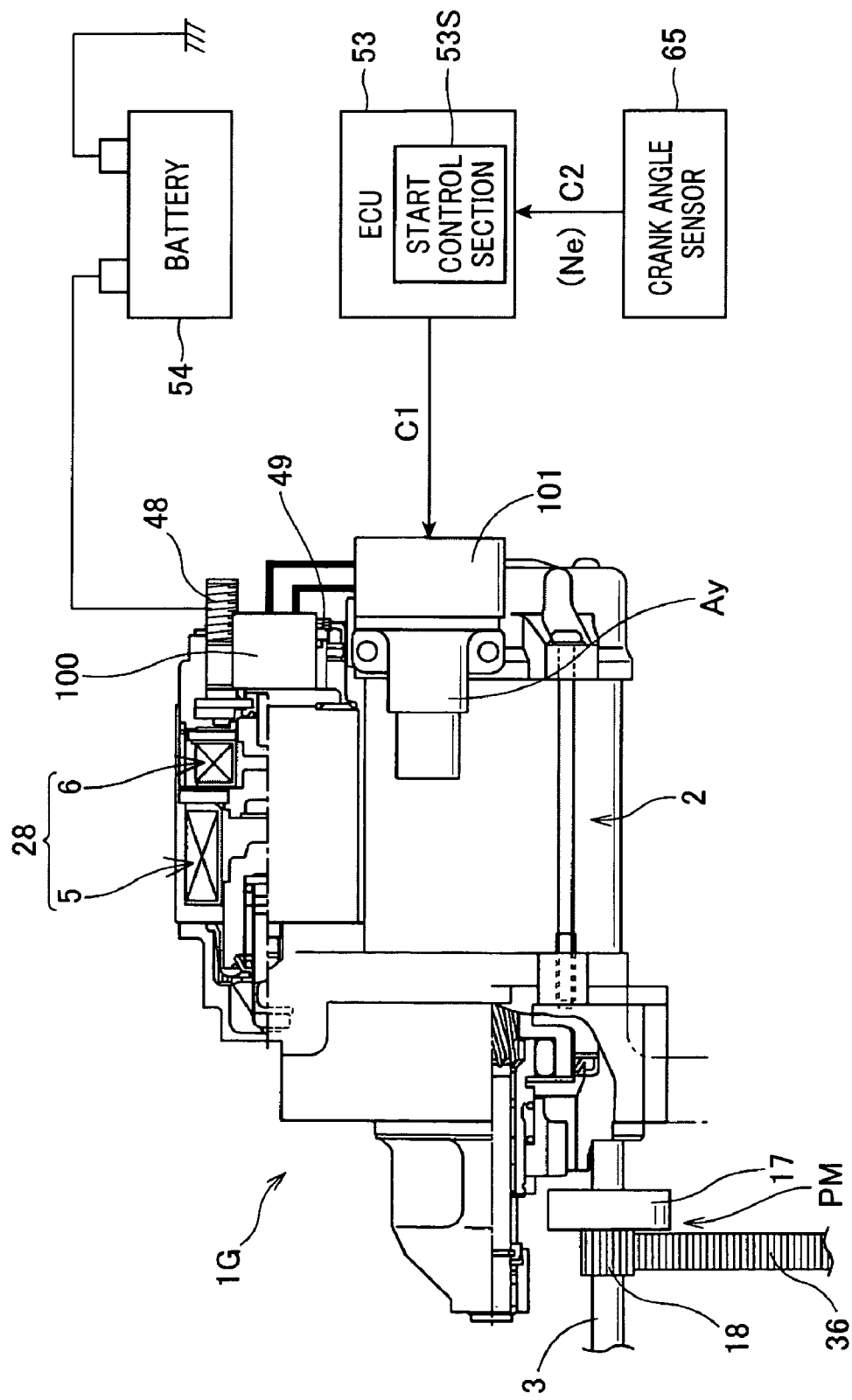
FIG. 21 is a structural view of a specific example of the structure of a starter according to the eighth embodiment of the present invention.
Figure 22:
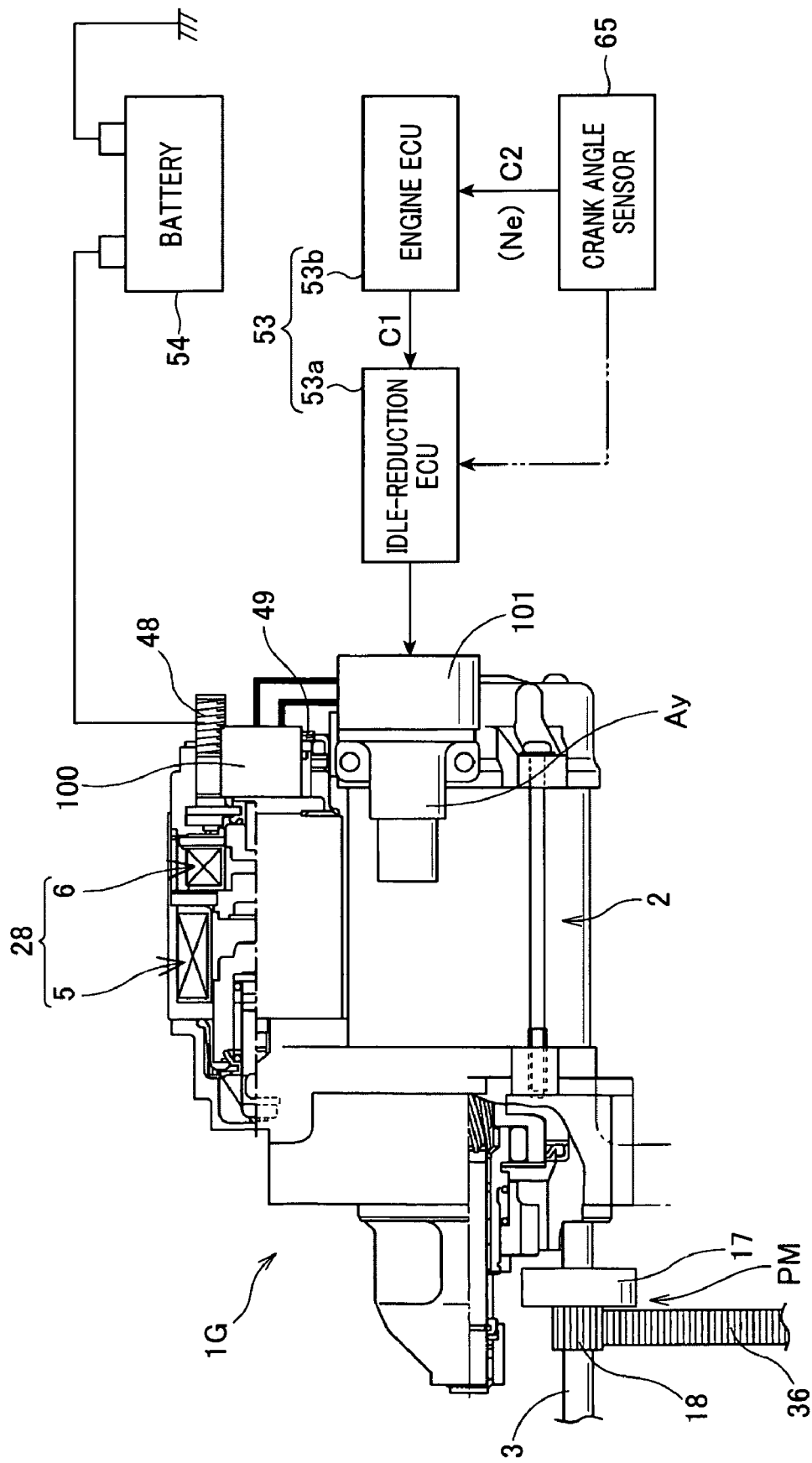
FIG. 22 is a structural view of an alternative specific example of the structure of the starter according to the eighth embodiment of the present invention.

Similarly, the ECU 53a illustrated in FIG. 22 is operative to output the drive signals to the respective semiconductor relays installed in the relay integrated circuit 100 (see steps S12 and S14 in FIG. 9 or 14) according to the start control signals C1 supplied from the engine ECU 53b. As the drive signals, given signals, such as the start control signals C1 (see FIG. 21), the signals including the start control signals, or signals different from the start control signals C1 can be used.

Figure 23:
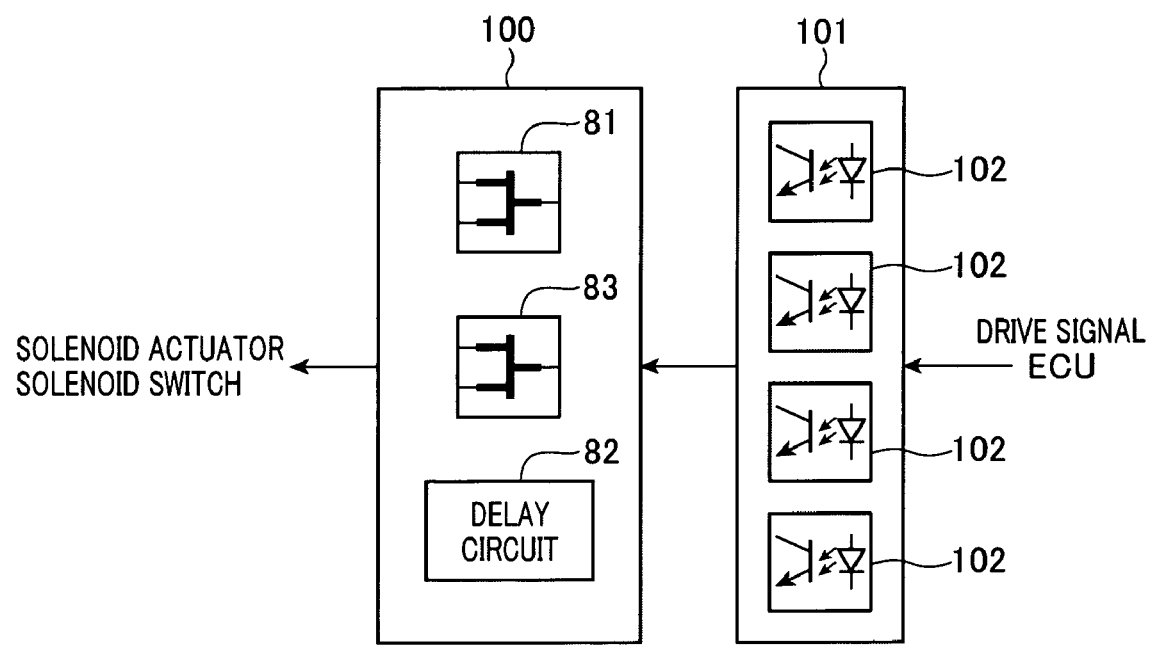
FIG. 23 is a block diagram schematically illustrating a relay integrated circuit module and an electrical insulating connector of the starter according to the eighth embodiment.

An example of the structure of each of the relay integrated circuit module 100 and the electrical insulating connector 101 is illustrated in FIG. 23. In the structure illustrated in FIG. 23, the electrical insulating connector 101 is electrically connected at its input terminals to the ECU (ECU 53 or ECU 53a), and electrically connected at its output terminals to input terminals of the relay integrated circuit module 100. Output terminals of the relay integrated circuit module 100 are electrically connected to the solenoid actuator 5, the solenoid switch 6, and the like of the solenoid device 28.

The electrical insulating connector 101 includes a given number of photocouplers 102; this number corresponds to the number of connection lines required to connect the ECU (ECU 53 or ECU 53a). For example, in the eighth embodiment, the electrical insulating connector 101 includes four photocouplers 102. The electrical insulating connector 101 is operative to transfer the drive signals outputted from the ECU (ECU 53 or ECU 53a) while its input terminals and its output terminals are coupled with electric galvanic isolation therebetween.

The relay integrated circuit module 100 is comprised of a plurality of semiconductor relays, such as the semiconductor relays 81 and 83. The relay integrated circuit module 100 is designed to activate the solenoid actuator 5 and the solenoid switch 6 in response to the drive signals outputted from the electrical insulating connector 101. The relay integrated circuit module 100 can be configured as a given circuit module, for example, as any one of the integrated circuit modules 80, 80A, 80B, and 80C illustrated in FIGS. 11, 15, 16, and 18, respectively.

As described above, the starter 1G according to the eighth embodiment is comprised of the solenoid device 28, the crank angle sensor 65 for outputting a signal indicative of the operating state of the ring gear 56, the ECU 53 or 53a for instructing the engine to start, and the relay integrated circuit module 100.

The relay integrated circuit module 100 is designed to determine, based on the drive signals from the ECU 53 or 53a, whether to start the engine. The relay integrated circuit module 100 is also designed to individually activate the solenoid actuator 5 and the solenoid switch 6 in accordance with a result of the determination.

The configuration of the relay integrated circuit module 100 uses the semiconductor relays 81 and 83 for activating the solenoid device 28 (solenoid actuator 5 and solenoid switch 6). Because the wiring for the electrical connections between the semiconductor relays and the solenoid device 28 is easier than that for the electrical connections between mechanical relays and the solenoid device 28, it is possible to reduce the starter 1G in size in comparison to starters using mechanical relays. This improves the mountability of the relay integrated circuit module 100 onto the solenoid device 28.

The starter 1G is configured such that the operations of the semiconductor relays 81 and 83 are individually controlled by the drive signals outputted from the start control section 53s installed in the ECU 53 (see FIG. 21). This configuration allows the semiconductor relays 81 and 83 and the ECU 53 to be integrally activated. This allows the ECU 53 to control the solenoid device 28 according to the characteristics of the engine, thus improving the flexibility of the overall control of the motor vehicle. In addition, because the configuration permits the ECU 53 to reliably control the solenoid device 28 equipped with the relay integrated circuit module 100, standardization of the ECU 53 can be facilitated.

The tarter 1G is configured such that the relay integrated circuit module 100 is provided with the delay circuit 82 that delays the activation timing of the solenoid switch 6 relative to the activation timing of the solenoid actuator 5 (see FIG. 23). Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

The tarter 1G is configured such that the engine ECU 53b for controlling the engine and the idle-reduction ECU 53a for controlling the solenoid device 28 constitute means for starting the engine (see FIG. 22). In addition, the idle-reduction ECU 53a is configured to control the activation of the solenoid device 28 according to the engine start signal C1 outputted from the engine ECU 53b. This configuration allows the engine ECU 53b to control the engine according to its type and model.

Moreover, because the idle-reduction ECU 53a is provided independently of the engine ECU 53b, it is possible to facilitate specialized standardization of the engine cranking by the starters including restarting the engine due to the engine automatic stop. Note that the configuration that the idle-reduction ECU 53a and the engine ECU 53b constitute the ECU 53 can be applied to each of the fourth to eighth embodiments.

Figure 24:
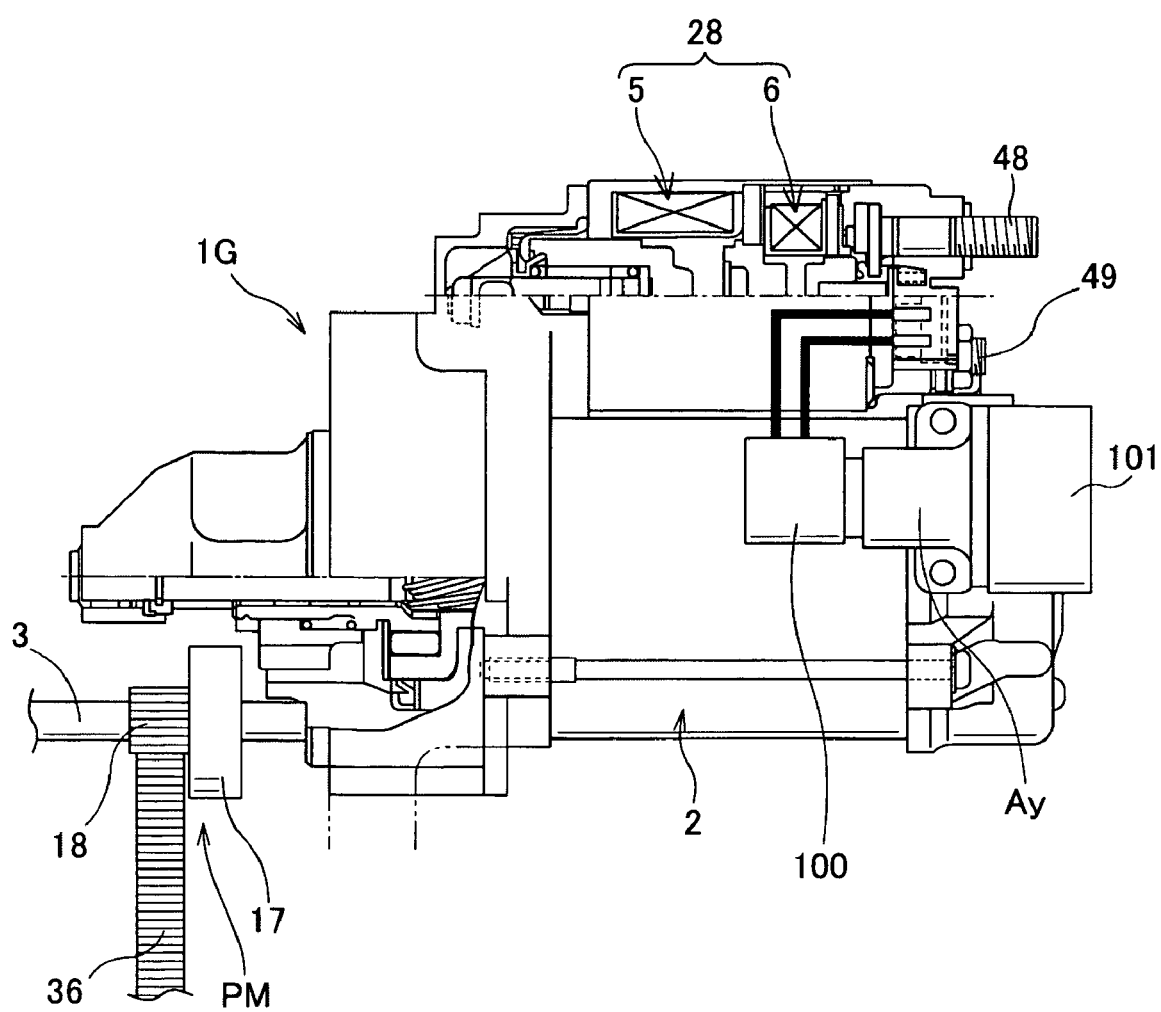
FIG. 24 is a modification of the starter according to the eighth embodiment.

As illustrated in FIG. 24, the starter 1G can be configured such that the relay integrated circuit module 100 is indirectly mounted on the solenoid device 28. For example, as illustrated in FIG. 24, the relay integrated circuit module 100 can be attached to a mounting member Ay on which the electrical insulating connector 101 is mounted, and the mounting member Ay can be directly mounted on the end housing 1b of the solenoid device 28.

The first to eighth embodiments of the present invention have been described, but the present invention is not limited to them. In other words, various modifications of the present invention within the scope thereof can be carried out.

In each of the fourth and sixth embodiments, the integrated circuit module 7A is directly mounted on the solenoid device 28, specifically on the housing or frame thereof (see FIGS. 7 and 17). In the fifth embodiment, the integrated circuit module 7B is indirectly mounted on the solenoid device 28. In the seventh embodiment, the integrated circuit module 7A is directly or indirectly mounted on a proper portion of the motor vehicle, which exists between the solenoid device 28 (solenoid actuator 5 and the solenoid switch 6) and the engine ECU 53. In eighth embodiment, the relay integrated circuit module 100 is directly or indirectly mounted on a proper portion of the motor vehicle, which exists between the solenoid device 28 (solenoid actuator 5 and the solenoid switch 6) and the ECU (engine ECU 53 or the idle-reduction ECU 53a).

In each of the fourth to eighth embodiments, the corresponding integrated circuit module or the relay integrated circuit module can be mounted in the motor vehicle in the same manner as another one of the fourth to eighth embodiments. For example, in each of the fourth and sixth embodiments, the integrated circuit module 7A can be mounted in the motor vehicle in the same manner as either the fifth embodiment or the seventh embodiment. In the second embodiment, the integrated circuit module 7A can be mounted in the motor vehicle in the same manner as any one of the fourth embodiment, sixth embodiment, and seventh embodiment.

That is, the integrated circuit module (relay integrated circuit module) can be freely mounted in the motor vehicle. The starters according to the fourth to eighth embodiments achieve the corresponding advantages set forth above independently of where the corresponding integrated circuit modules (relay integrated circuit modules) of their starters are provided.

In place of the crank angle sensor 65 and the rotational position sensor 90, another sensor for detecting the operating condition of at least one of the ring gear 36 and the movable pinion member PM, such as an optical sensor, a magnetic sensor, a contact switch, such as a limit switch, or the like can be used. This modification for each of the fourth to eighth embodiment can achieve the corresponding advantages.

In place of the ECU 53 (or the idle-reduction ECU 53a and the engine ECU 53b) as starting means for outputting an instruction to start the engine, another controller can be used. This modification for each of the fourth to eighth embodiment can achieve the corresponding advantages.

In each of the first to eighth embodiments, the movable pinion member PM and the ring gear 36 are engaged with each other in an engine operation mode in which the engine is started, but the movable pinion member PM and the ring gear 36 are disengaged with each other in another mode. However, the present invention is not limited to the structure.

Specifically, the movable pinion member PM and the ring gear 36 can be permanently engaged with each other independently of any engine operation mode. Because the clutch 17 is designed as a one-way clutch, the permanent engagement of the movable pinion member PM with the ring gear 36 can be easily applied to each of the first to eighth embodiments. Even if the clutch 17 is not designed as a one-way clutch, when a one-way clutch is attached to any one of the movable pinion member PM and the ring gear 36, the permanent engagement of the movable pinion member PM with the ring gear 36 can be applied to each of the first to eighth embodiments.

The permanent engagement of the movable pinion member PM with the ring gear 36 eliminates the need to shift the movable pinion member PM to the ring gear 36 to be meshed therewith. Thus, each of the starters to which the permanent engagement of the movable pinion member PM with the ring gear 36 is applied eliminates the solenoid actuator 5, the shift lever 4, and the relay 67, thus maintaining each of the starters at a lower cost by the elimination.

The structure of the integrated circuit module illustrated in FIG. 11 is applied to the starter according to the fourth embodiment, the structure of the integrated circuit module illustrated in each of FIGS. 15 and 16 is applied to the starter according to the fifth embodiment, and the structure of the integrated circuit module illustrated in FIG. 18 is applied to the starter according to the sixth embodiment, but the present invention is not limited to the applications.

Specifically, the structure of the integrated circuit module illustrated in FIG. 11 can be applied to the starter according to each of the fifth to eighth embodiments, the structure of the integrated circuit module illustrated in each of FIGS. 15 and 16 can be applied to the starter according to each of the fourth, sixth, seventh, and eighth embodiments, and the structure of the integrated circuit module illustrated in FIG. 18 can be applied to the starter according to each of the fourth, fifth, seventh, and eighth embodiments. In each of these modifications, because after the pinion 18 has been tightly meshed with the ring gear 36, the pinion 18 and the ring gear 36 are turned by the motor 2. Thus, it is possible to achieve the advantages of a corresponding one of the fourth to eighth embodiments.

In the eighth embodiment, the idle-reduction ECU 53a is configured to output the drive signals to the relay integrated circuit module 100 via the electrical insulating connector 101 according to the start control signal C1 transferred from the engine ECU 53b, but the present invention is not limited to the configuration.

Specifically, the idle-reduction ECU 53a can be configured to output the drive signals to the relay integrated circuit module 100 via the electrical insulating connector 101 independently of the engine ECU 53b. For example, as illustrated in FIG. 22 by chain double dashed line, the idle-reduction ECU 53a can be configured to output the drive signals to the relay integrated circuit module 100 via the electrical insulating connector 101 according to the signal C2 outputted from the crank angle sensor 65.

This configuration facilitates specialized standardization of the engine cranking by the starters including restarting the engine due to the engine automatic stop.

In each of the fourth to seventh embodiments, the starter includes the integrated circuit module 7A or 7B, and in the eighth embodiment, the starter includes the relay integrated circuit module 100, but the starters according to the fourth to eighth embodiment can be designed without using the integrated circuit module of or the relay integrated circuit module.

Figure 25:
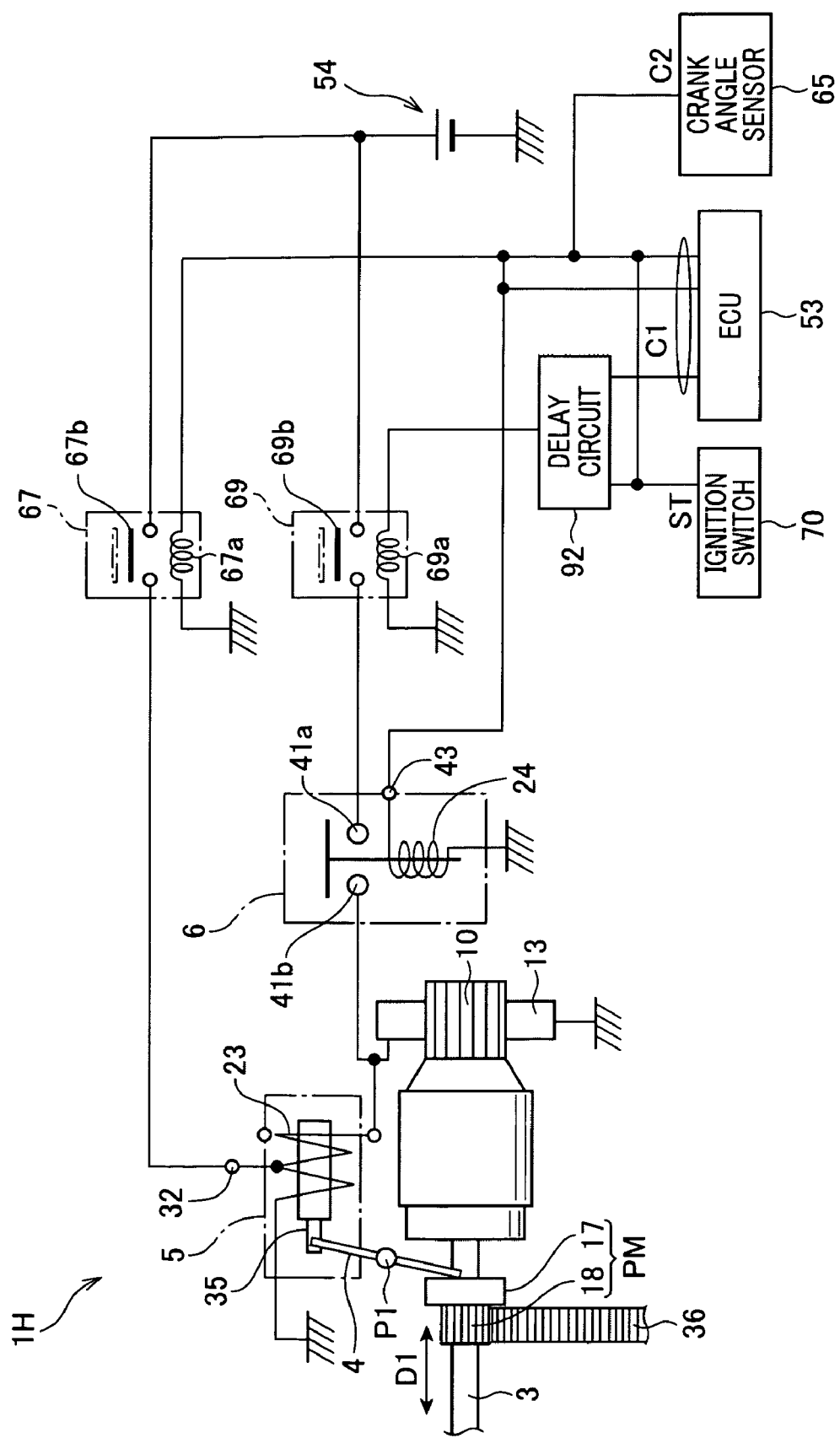
FIG. 25 is a circuit diagram schematically illustrating an example of the structure of modification of the starter according to each of the fourth to seventh embodiments.

An example of the structure of one of the starters according to the modification is illustrated in FIG. 25. In FIGS. 18 and 25, like parts illustrated therebetween, to which like reference characters are assigned, are omitted or simplified in redundant description.

A starter 1H includes the relay 67, a relay 69 consisting of a solenoid 69a and a switch 69b, and the delay circuit 92.

One end of the solenoid 67a is electrically connected to each of the engine ECU 53, the crank angle sensor 65, and the ignition switch 70, and the other thereof is grounded.

The switch 67b is electrically connected between the positive terminal of the battery 54 and the first terminal 32 of the solenoid actuator 5 via the metal plate 33. The switch 67b is turned on (closed) by magnetic force generated when the solenoid 67a is energized by the integrated circuit module 7A, thus energizing the fi st coil 23.

One end of the solenoid 69a is electrically connected to the output terminal of the delay circuit 92, and the other thereof is grounded.

The switch 69b is electrically connected between the positive terminal of the battery 54 and the stationary contact 41a of the solenoid switch 6 via the second terminal 43. The ignition switch 70 and the engine ECU 53 are electrically connected to the input terminals of the delay circuit 92, respectively.

The engine ECU 53 is electrically connected to the second terminal 43 of the solenoid switch 6.

When the pinion engagement signal C1a included in the engine start signal C1 is outputted from the engine ECU 51 or the signal C2 is outputted from the crank angle sensor 65, the pinion engagement signal C1a or the signal C2 is supplied to the relay 67. Thus, the relay 67 is turned on (closed) so that power of the battery 54 is applied to the first coil 23 via the relay 67. This results in that the solenoid actuator 5 is activated so that the pinion 18 is meshed with the ring gear 36.

Thereafter, when the starter ON signal ST is outputted from the ignition switch 70 or the engine start instruction C1b included in the engine start signal C1 is outputted from the engine ECU 53, the signal ST or C1b is inputted to the delay circuit 92 so as to be delayed thereby. Thereafter, the signal ST or C1b is supplied to the relay 69. Thus, the relay 69 is turned on (closed) so that the power of the battery 54 is applied to the stationary contact 41a.

At that time, when the engine ECU 53 supplies the engine start instruction C1b to the second coil 24 via the second terminal 43. This results in that the solenoid switch 6 is turned on so that the motor 2 is driven to rotate the pinion 18 and the ring gear 36, thus cranking the engine.

After the pinion 18 has been tightly meshed with the ring gear 36, the pinion 18 and the ring gear 36 is turned by the motor 2. Thus, it is possible to reduce wear of the pinion 18 or the ring gear 36 due to the rotation of the pinion 18 and the ring gear 36 with insufficient engagement therebetween, and to reduce noise due to the engagement of the pinion 18 with the ring gear 36.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A starter for starting an internal combustion engine with a first output shaft to which a ring gear is coupled, the starter comprising:
    a motor having a second output shaft to which a movable pinion member is coupled and operative to, when energized, rotate the second output shaft;
    a solenoid device comprising:
        a solenoid actuator linked to the movable pinion member, the solenoid actuator being configured to, when activated, shift the movable pinion member toward the ring gear to be engaged with the ring gear; and
        a solenoid switch configure to, when activated, energize the motor, the solenoid actuator and the solenoid switch being integrated with each other to provide the solenoid device; and
    a controller module configured to individually control an activation of the solenoid actuator and an activation of the solenoid switch, the controller module being mounted on the solenoid device.

2. The starter according to claim 1, further comprising a housing that supports the motor, the solenoid device comprises:
    a cylindrical case having an inner hollow portion, one axial end fixed to the housing of the starter, and the other axial end that is opening, the solenoid actuator and the solenoid switch being stored in the inner hollow portion of the cylindrical case so that the solenoid actuator and the solenoid switch are aligned in an axial direction of the cylindrical case;
    a cover that covers the other axial end of the cylindrical case; and
    two terminal bolts attached to the cover and electrically connected to the motor,
    and the controller module comprises:
    a control circuit for performing the individual control of the activation of the solenoid actuator and the activation of the solenoid switch; and
    a case member that encloses the control circuit, the case member being attached to the cover of the solenoid device.

3. The starter according to claim 1, wherein the case member is fixedly mounted on the cover of the solenoid device through at least one of the two terminal bolts.

4. The starter according to claim 1, further comprising a frame that supports the motor, the motor being integrated with the solenoid actuator and the solenoid switch so as to provide the solenoid device, the controller module being fixedly mounted on the frame of the motor.

5. The starter according to claim 1, wherein the motor comprises a yoke that serves as a housing of the motor, the motor being integrated with the solenoid actuator and the solenoid switch so as to provide the solenoid device, the controller module being fixedly mounted on the yoke of the motor.

6. The starter according to claim 1, further comprising a sensor that generates a first signal indicative of an operating condition of at least one of the ring gear and the movable pinion member, and an engine starting unit configured to output a second signal for instructing a start of the internal combustion engine,
    wherein the controller module is configured to:
    determine whether to start the internal combustion engine based on the first signal generated by the sensor and the second signal for instructing the start of the internal combustion engine; and
    individually control the activation of the solenoid actuator and the activation of the solenoid switch based on a result of the determination.

7. The starter according to claim 6, further comprising a housing that supports at least part of the solenoid device, wherein the sensor is configured to generate the first signal indicative of a rotational condition of the at least one of the ring gear and the movable pinion member as the operating condition thereof, the sensor being attached to the housing of the starter.

8. The starter according to claim 6, wherein the engine starting unit comprises an engine control unit that carries out control of the internal combustion engine; and a starter control unit that carries out control of the solenoid device, and the controller module is configured to individually control the activation of the solenoid actuator and the activation of the solenoid switch in cooperation with the starter control unit.

9. The starter according to claim 1, further comprising a sensor that generates a first signal indicative of an operating condition of at least one of the ring gear and the movable pinion member,
wherein the starter is connected to an engine starting unit, the engine starting unit being configured to output a second signal for instructing a start of the internal combustion engine, and
the controller module is configured to:
determine whether to start the internal combustion engine based on the first signal generated by the sensor and the second signal for instructing the start of the internal combustion engine; and
individually control the activation of the solenoid actuator and the activation of the solenoid switch based on a result of the determination.

10. The starter according to claim 9, further comprising a housing that supports at least part of the solenoid device, wherein the sensor is configured to generate the first signal indicative of a rotational condition of the at least one of the ring gear and the movable pinion member as the operating condition thereof, the sensor being attached to the housing of the starter.

11. The starter according to claim 1, wherein the controller module is configured to:
activate the solenoid actuator during a rotational speed of the first output shaft of the internal combustion engine being decelerated to thereby shift the movable pinion member toward the ring gear that is rotating to be engaged with the ring gear; and
activate the solenoid switch to energize the motor so that the motor is rotated together with the ring gear and the movable pinion member.

12. The starter according to claim 1, wherein the controller module comprises a control circuit for performing the individual control of the activation of the solenoid actuator and the activation of the solenoid switch, the control circuit comprising a plurality of circuit components, at least one of the plurality of circuit components being designed to be replaceable with another circuit element.

13. The starter according to claim 1, further comprising a sensor that generates a first signal indicative of an operating condition of at least one of the ring gear and the movable pinion member,
wherein the starter is connected to an engine starting unit, the engine starting unit being configured to output a second signal for instructing a start of the internal combustion engine according to the first signal indicative of the operating condition of the at least one of the ring gear and the movable pinion member, and
the controller module comprises:
a relay integrated circuit module comprising a semiconductor relay member that is electrically connected to the solenoid actuator and the solenoid switch, the relay integrated circuit module being configured to:
determine whether to start the internal combustion engine based on the second signal for instructing the start of the internal combustion engine; and
activate the semiconductor relay member based on a result of the determination to thereby individually control the activation of the solenoid actuator and the activation of the solenoid switch.

14. The starter according to claim 13, wherein the semiconductor relay member includes a first semiconductor relay and a second semiconductor relay that are electrically connected to the solenoid actuator and the solenoid switch, respectively, an activation of each of the first and second semiconductor relays being controlled according to a drive signal for a corresponding one of the first and second semiconductor relays; this drive signal is outputted from the engine starting unit as the second signal.

15. The starter according to claim 1, further comprising:
a delay circuit operatively connected to the controller module and operative to delay a timing of the activation of the solenoid switch relative to a timing of the activation of the solenoid actuator.

* * * * *